US012580957B1

(12) United States Patent
Collado Umana et al.

(10) Patent No.: US 12,580,957 B1
(45) Date of Patent: Mar. 17, 2026

(54) ADVERSARIAL ATTACK DETECTION BASED ON SIMILARITY

(71) Applicant: HiddenLayer, Inc., Austin, TX (US)

(72) Inventors: Julian Collado Umana, Irvine, CA (US); Andrew Davis, Portland, OR (US)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 19/270,337

(22) Filed: Jul. 15, 2025

(51) Int. Cl.
 *H04L 29/06* (2006.01)
 *H04L 9/40* (2022.01)
(52) U.S. Cl.
 CPC ................................ *H04L 63/1466* (2013.01)
(58) Field of Classification Search
 CPC ................................................ H04L 63/1466
 USPC .......................................................... 726/22
 See application file for complete search history.

(56) References Cited

U.S. PATENT DOCUMENTS

| | | | | | |
|---|---|---|---|---|---|
| 7,599,922 | B1 * | 10/2009 | Chen | ..................... | G06F 16/951 |
| | | | | | 707/999.005 |
| 12,259,895 | B1 * | 3/2025 | Huang | .............. | G06F 16/24578 |
| 12,393,752 | B1 * | 8/2025 | Lin | .......................... | G06F 30/27 |
| 2005/0234879 | A1 * | 10/2005 | Zeng | ..................... | G06F 16/951 |
| 2010/0098306 | A1 * | 4/2010 | Madabhushi | ........ | G06V 20/695 |
| | | | | | 382/128 |
| 2012/0159620 | A1 * | 6/2012 | Seifert | ................ | H04L 63/1416 |
| | | | | | 726/22 |
| 2012/0263388 | A1 * | 10/2012 | Vaddadi | ................ | G06F 16/583 |
| | | | | | 382/225 |

| | | | | | |
|---|---|---|---|---|---|
| 2019/0354802 | A1 * | 11/2019 | Lin | ........................ | G06V 20/00 |
| 2020/0272668 | A1 * | 8/2020 | Lin | ..................... | G06F 16/9027 |
| 2021/0319784 | A1 | 10/2021 | Le Roux et al. | | |
| 2021/0406260 | A1 * | 12/2021 | Sharifi | .................... | G06F 18/22 |
| 2022/0086179 | A1 | 3/2022 | Levin et al. | | |
| 2022/0116420 | A1 | 4/2022 | Weber et al. | | |
| 2022/0201008 | A1 | 6/2022 | Stergioudis | | |
| 2022/0230093 | A1 * | 7/2022 | Kostakis | ................ | G06N 20/00 |
| 2023/0252140 | A1 | 8/2023 | Coulter | | |

(Continued)

OTHER PUBLICATIONS

Rezaei, "A Target-Agnostic Attack on Deep Models: Exploiting Security Vulnerabilities of Transfer Learning", 2020, arXiv, pp. 1-14 (Year: 2020).*

(Continued)

*Primary Examiner* — Taghi T Arani
*Assistant Examiner* — Gregory A Lane
(74) *Attorney, Agent, or Firm* — Jones Day

(57) ABSTRACT

A query is received which is to be input into a machine learning model (or other artificial intelligence model). Thereafter, a plurality of historical queries of the machine learning model meeting first criteria relative to the query is determined using a first distance-based similarity analysis technique. Each of the historical queries have a known output by the machine learning model. An output of the machine learning model responsive to query is received. Next, it is determined, using a second distance-based similarity analysis technique, whether the output meets second criteria relative to each of the known outputs corresponding to the historical queries. This determination characterizes whether the query is likely to cause the machine learning model to behave in an undesired manner and can be provided to a consuming application or process. Related apparatus, systems, and techniques are also described.

30 Claims, 24 Drawing Sheets

(56) References Cited

U.S. PATENT DOCUMENTS

| | | | |
|---|---|---|---|
| 2024/0013220 A1 | 1/2024 | Martins | |
| 2024/0098108 A1* | 3/2024 | Limb | H04L 63/1425 |
| 2024/0330343 A1* | 10/2024 | Xie | G06F 16/3347 |
| 2024/0430273 A1 | 12/2024 | Millar et al. | |
| 2025/0069128 A1* | 2/2025 | Tomar | G06Q 30/0625 |
| 2025/0156870 A1* | 5/2025 | Bondoux | G06Q 20/34 |
| 2025/0165617 A1 | 5/2025 | Cameron et al. | |
| 2025/0173415 A1* | 5/2025 | Maizels | H04R 1/028 |
| 2025/0245344 A1 | 7/2025 | Singla | |

OTHER PUBLICATIONS

Chen, "DarkRank: Accelerating Deep Metric Learning via Cross Sample Similarities Transfer", 2018, AAAI, pp. 2852-2858 (Year: 2018).*

* cited by examiner

800

900

Model M using the embedded space as input

Model M using the original space representation x_1 as input

Four nearest neighbors of e_4 with distances

Distance between four nearest neighbors of e_4 with
respect to each other

1900

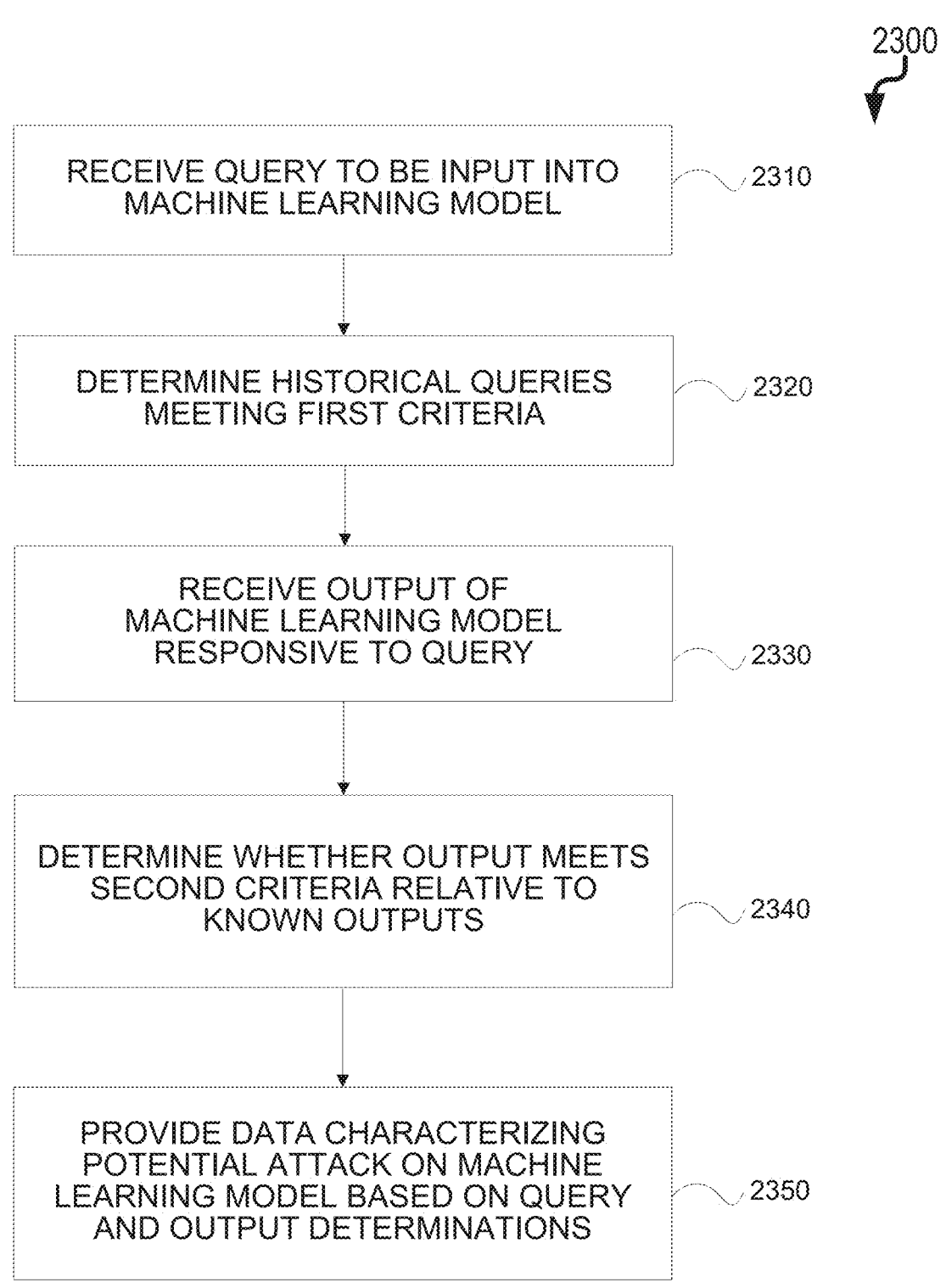

2300

RECEIVE QUERY TO BE INPUT INTO
MACHINE LEARNING MODEL                2310

DETERMINE HISTORICAL QUERIES
MEETING FIRST CRITERIA                2320

RECEIVE OUTPUT OF
MACHINE LEARNING MODEL
RESPONSIVE TO QUERY                   2330

DETERMINE WHETHER OUTPUT MEETS
SECOND CRITERIA RELATIVE TO
KNOWN OUTPUTS                         2340

PROVIDE DATA CHARACTERIZING
POTENTIAL ATTACK ON MACHINE
LEARNING MODEL BASED ON QUERY         2350
AND OUTPUT DETERMINATIONS

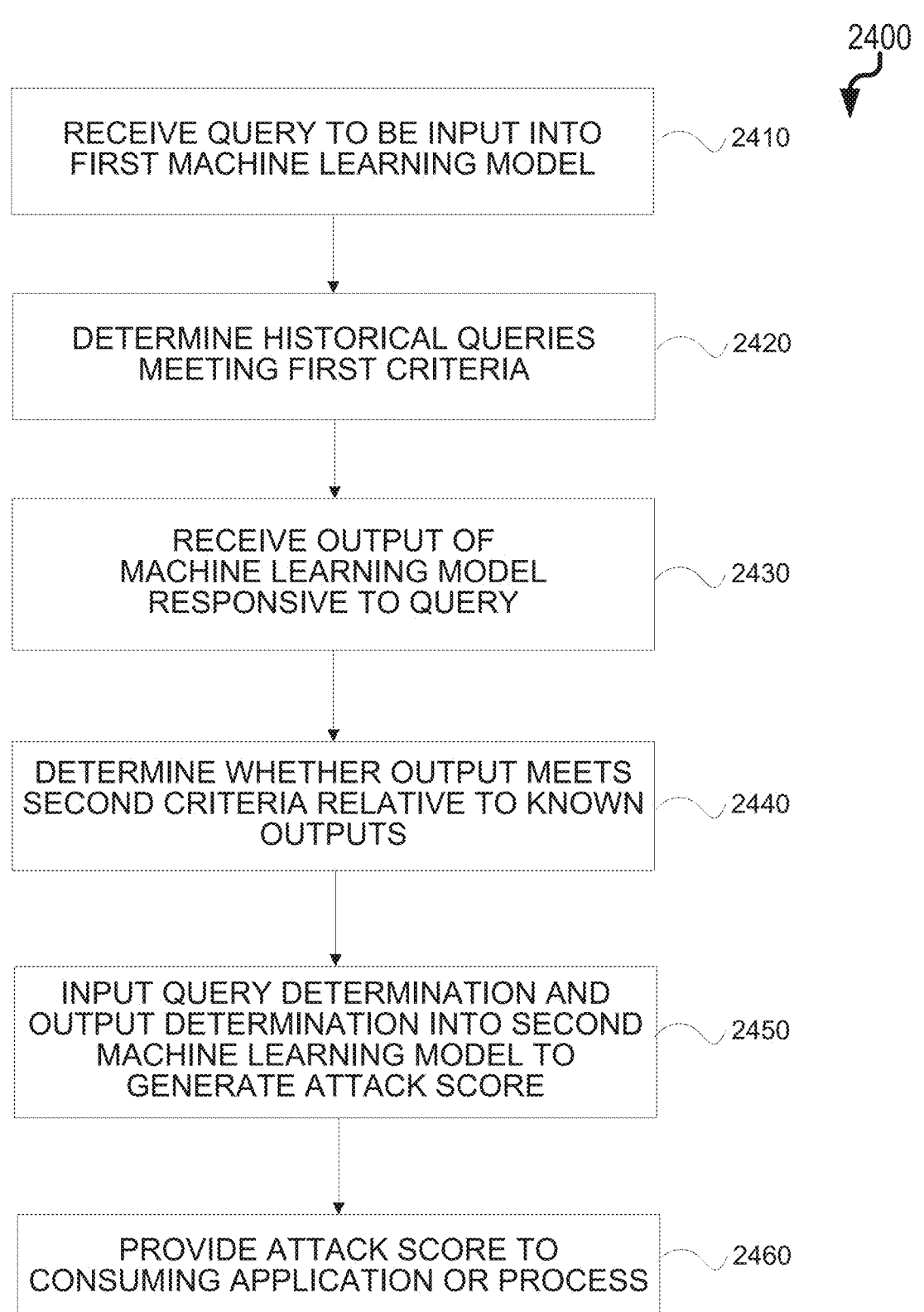

RECEIVE QUERY TO BE INPUT INTO
FIRST MACHINE LEARNING MODEL                    2410

DETERMINE HISTORICAL QUERIES
MEETING FIRST CRITERIA                          2420

RECEIVE OUTPUT OF
MACHINE LEARNING MODEL
RESPONSIVE TO QUERY                             2430

DETERMINE WHETHER OUTPUT MEETS
SECOND CRITERIA RELATIVE TO KNOWN
OUTPUTS                                         2440

INPUT QUERY DETERMINATION AND
OUTPUT DETERMINATION INTO SECOND
MACHINE LEARNING MODEL TO
GENERATE ATTACK SCORE                           2450

PROVIDE ATTACK SCORE TO
CONSUMING APPLICATION OR PROCESS                2460

FIG. 24

ADVERSARIAL ATTACK DETECTION BASED ON SIMILARITY

TECHNICAL FIELD

The subject matter described herein relates to techniques for detecting adversarial attacks on machine learning models based on sample similarity to prevent such machine learning models from operating in an undesired manner.

BACKGROUND

Machine learning (ML) models are increasingly being subjected to distributed adversarial attacks in which a plurality of users, in a coordinated fashion, query a machine learning model to cause it to behave in an undesired manner. In some cases, the adversarial attacks can be used to cause the model to misclassify or provide wrong values as outputs. In other cases, the adversarial attacks can be used to have the machine learning model provide information to replicate the model thus allowing a malicious actor to effectively steal the model.

SUMMARY

In a first aspect, a query to be input into a machine learning model (or other artificial intelligence model) is received. Thereafter, a plurality of historical queries of the machine learning model meeting first criteria (e.g., distance, within n nearest neighbors, within a centroid, etc.) relative to the query is determined using a first distance-based similarity analysis technique. Each of the historical queries have a known output by the machine learning model. An output of the machine learning model responsive to query is received. Next, it is determined, using a second distance-based similarity analysis technique, whether the output meets second criteria (e.g., distance, within k nearest neighbors, within a centroid, etc.) relative to each of the known outputs corresponding to the historical queries. This determination characterizes whether the query is likely to cause the machine learning model to behave in an undesired manner and can be provided to a consuming application or process. In some cases, a remediation action can be initiated by the consuming application or process (or downstream thereof) to prevent the machine learning model from behaving in an undesired manner.

The first distance-based similarity analysis technique can be the same as the second distance-based similarity analysis technique. In other variations, these distance-based similarity analysis techniques differ.

The first criteria can be a first distance threshold and the second criteria can be a second, different distance threshold. In some cases, the same distance threshold is used by the first distance-based similarity analysis technique and the second distance-based similarity analysis technique. The distance threshold(s) can be static or, in some variations, variable based on different factors.

The historical queries can originate partially or solely from the requestor of the query. In other variations, the historical queries can originally exclusively from users different than the requestor of the query. In some cases, different weights can be applied to different historical queries. For example, historical queries from the user can be weighted more than queries from other users. Other weighting mechanisms can be implemented based on recency, populations of users and the like.

At least some of the historical queries can be derived from a cluster of neighboring historical queries (i.e., historical queries can be combined, etc.). With such a variations, at least one of the first distance-based similarity analysis and the second distance-based similarity analysis can considers distances between neighbors within the plurality of historical queries.

The distance-based similarity analysis techniques can take different forms including algorithms incorporating one or more of: k-nearest neighbor analysis, Euclidean distance calculations, Minkowski distance calculations, cosine distance calculations, Hamming distance calculations and/or Levenshtein distance calculations.

In some cases, the determination using the second distance-based similarity analysis technique can calculate a mean distance of the output to the known outputs corresponding to the historical queries. This mean distance can be used to determine whether the second criteria has been met.

In a further interrelated aspect, a query to be input into an artificial intelligence (AI) model is received and an embedding is generated based on the query. A plurality of historical queries of the AI model having a corresponding embedding meeting first criteria relative to the generated embedding is determined, using a first distance-based similarity analysis technique. Each of the historical queries has a known output by the AI model. An output of the AI model responsive to the query is received. It is then determined, using a second distance-based similarity analysis technique, whether the output meets second criteria relative to each of the known outputs of the historical queries. This latter determination characterizes whether the query is likely to cause the AI model to behave in an undesired manner and can be provided to a consuming application or process. In some cases, a remediation action can be initiated by the consuming application or process (or downstream thereof) to prevent the AI model from behaving in an undesired manner. An embedding can be generated based on the output and the latter determination can be based on whether the embedding generated based on the output meets the second criteria relative to embeddings corresponding to each of the known outputs of the historical queries.

In yet a further interrelated aspect, a query is received which is to be input into a machine learning model. A plurality of historical queries of the machine learning model meeting first criteria relative to the query are determined using a first distance-based similarity analysis technique. Each of the historical queries has a known output by the machine learning model. Further, an output of the machine learning model responsive to the query is received. An embedding can then be generated based on the output. It is then determined, using a second distance-based similarity analysis technique, whether the generated output meets second criteria relative to embeddings corresponding to each of the known outputs of the historical queries. This second determination characterizes whether the query is likely to cause the machine learning model to behave in an undesired manner and can be provided to a consuming application or process. At least one remediation action can be initiated by the consuming application or process (or downstream thereof) to prevent the machine learning model from behaving in an undesired manner. In some variations, an embedding is also generated based on the input and is the query analysis is based on whether the embedding generated based on the input meets the first criteria relative to embeddings corresponding to inputs for each of the known of the historical queries.

In still a further interrelated aspect, a query is received which is to be input into a first machine learning model. A plurality of historical queries of the first machine learning model meeting first criteria relative to the query are determined using a first distance-based similarity analysis technique. Each of the historical queries has a known output by the first machine learning model. In addition, an output of the machine learning model responsive to the output is received. It is then determined, using a second distance-based similarity analysis technique, whether the output meets second criteria relative to each of the known outputs corresponding to the historical queries. Data characterizing the determinations respectively made using the first distance-based similarity analysis technique and the second distance-based similarity analysis techniques (e.g., extracted features and/or derived features, etc.) are input into a second machine learning model to generate an attack score. The attack score indicates a likelihood of the query causing the first machine learning model to behave in an undesired manner. The attack score can be provided to a consuming application or process. In some cases, a remediation action can be initiated by the consuming application or process (or downstream thereof) based on the attack score meeting or exceeding a threshold to prevent the first machine learning model from behaving in an undesired manner.

The subject matter described herein provides many technical advantages. For example, the current subject matter can be used to identify and remediate adversarial attacks on machine learning models and/or machine learning model architectures. The adversarial attacks addressed by the current subject matter can include evasion attacks originating from multiple users in which the objective is to make a machine learning model misclassify or predict the wrong value for a sample (i.e., an input such as a prompt, etc.) by adding minor modifications to it over time. Adversarial attacks addressed by the current subject matter also encompass model stealing attacks originating from multiple users in which the objective is to steal or replicate a model by sending a larger number samples in order to replicate or mimic the behavior of the machine learning model being attacked.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 23 is a first process flow diagram illustrating a technique for identifying an adversarial attack on a machine learning model; and FIG. 24 is a second process flow diagram illustrating a technique for identifying an adversarial attack.

Like reference symbols in the various drawings indicate like elements.

DETAILED DESCRIPTION

The current subject matter is directed to techniques for detecting an adversarial attack on a machine learning model and/or a machine learning model architecture. While the term machine learning model is used, the current subject matter is applicable to a wide array of artificial intelligence models. The adversarial attacks can originate from a single user or be distributed in that multiple user accounts/users are employed. These adversarial attacks can, for example, originate through a public facing application programming interface (API) in which users can submit samples to a model and obtain some output from the AI models. The submission history (e.g., sample log, output log, etc.) for particular users (which can be unique or otherwise have an identifier associated therewith) can be stored (e.g., in a computing environment executing the AI models and/or in a computing environment external to the AI model environment which monitors inputs and/or outputs of the AI model) or otherwise made available for the techniques provided herein.

Figure 1:
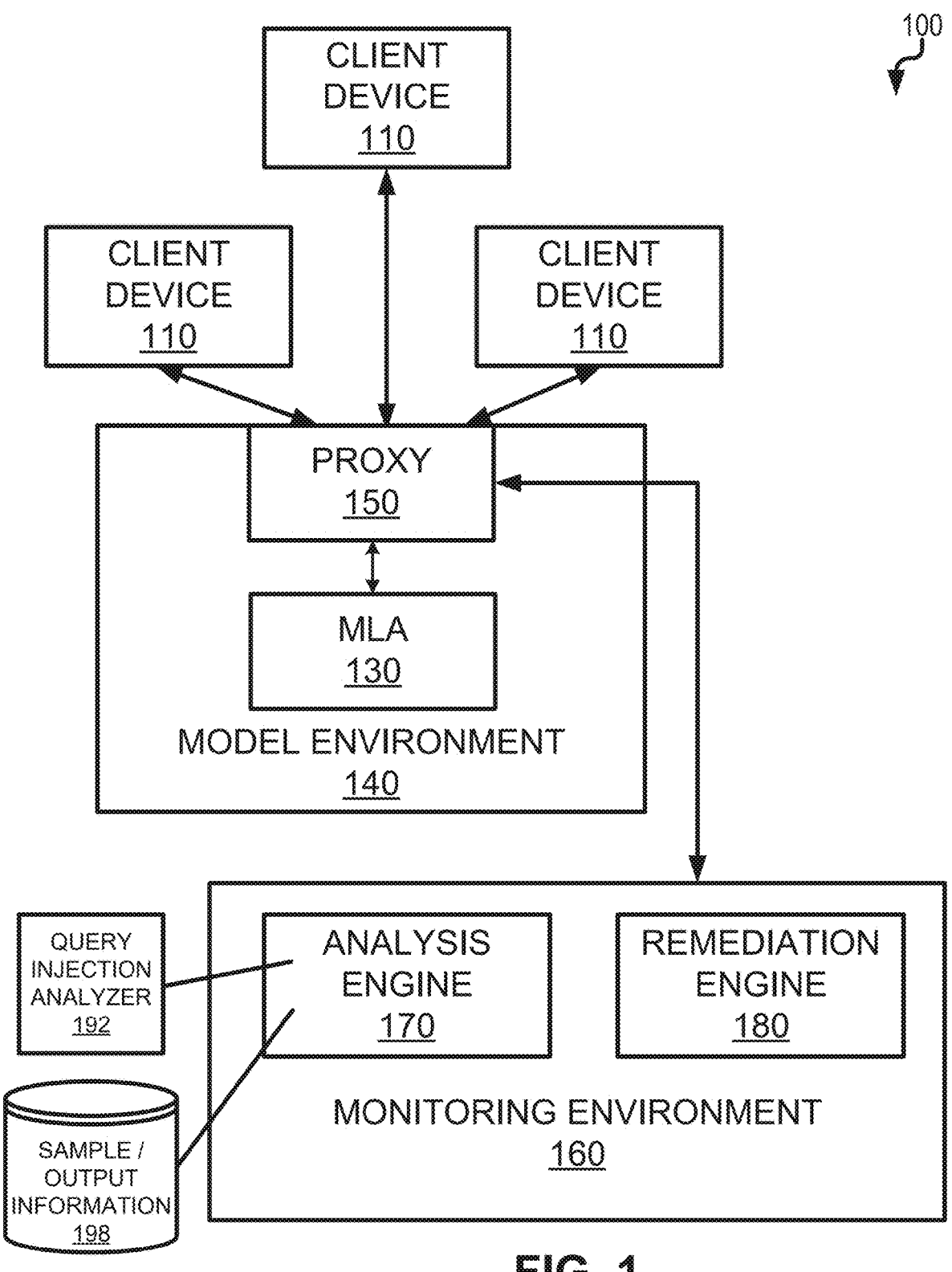
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. It will be appreciated that querying the MLA 130 can refer to querying one or more machine learning models which form part of the MLA 130. These queries can include or otherwise characterize various information including prompts ((e.g., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130. The analysis engine 170 can execute a query injection analyzer 192 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information. The analysis engine 152 and/or the query injection analyzer 192 (directly or indirectly) can access a data store 198 which, in some variations, comprises information about users including account information, samples, probes, outputs of the MLA 130 and the like. The data store 198 can be local to the monitoring environment 160 or it may be remote.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
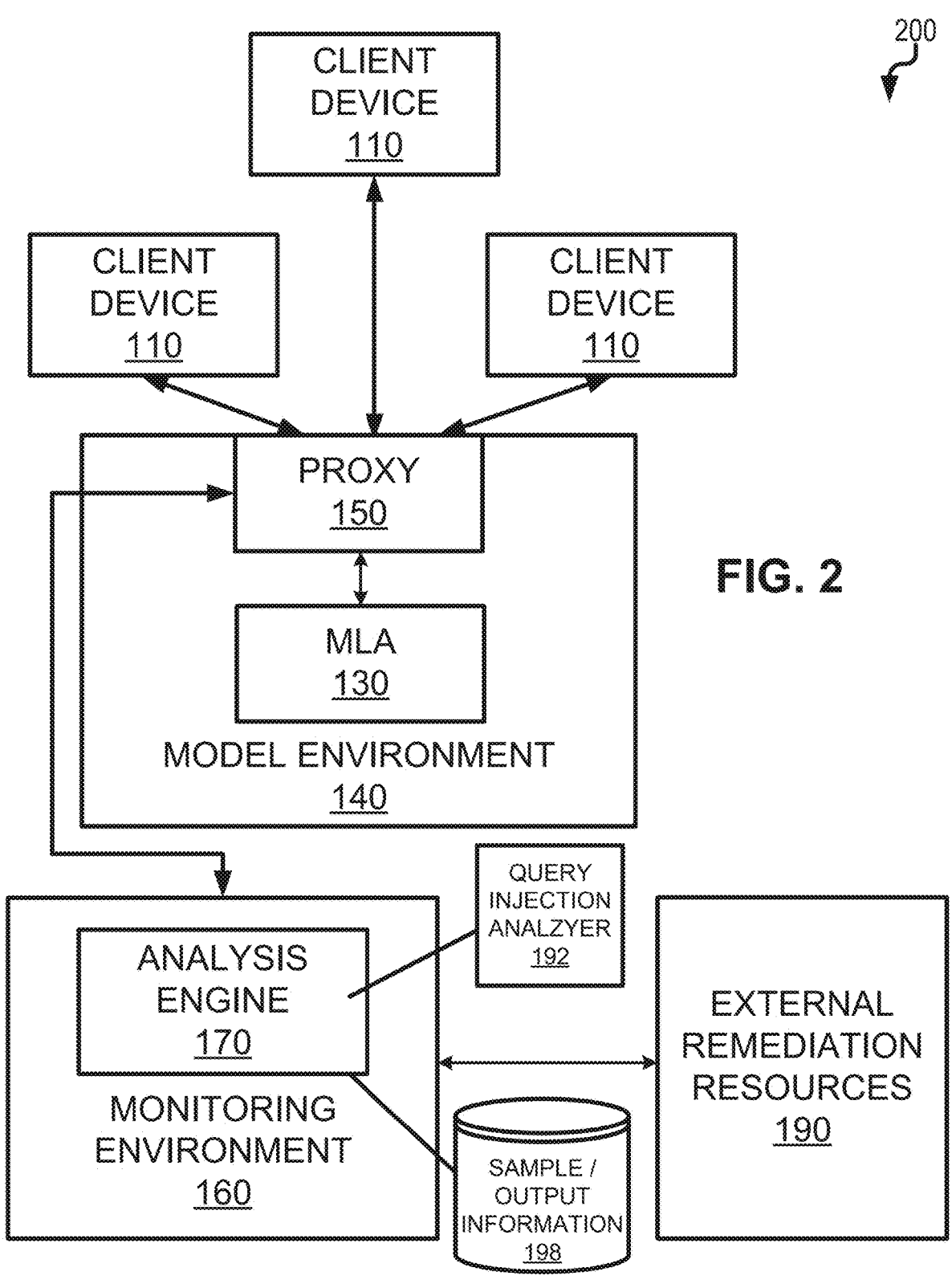
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more AI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
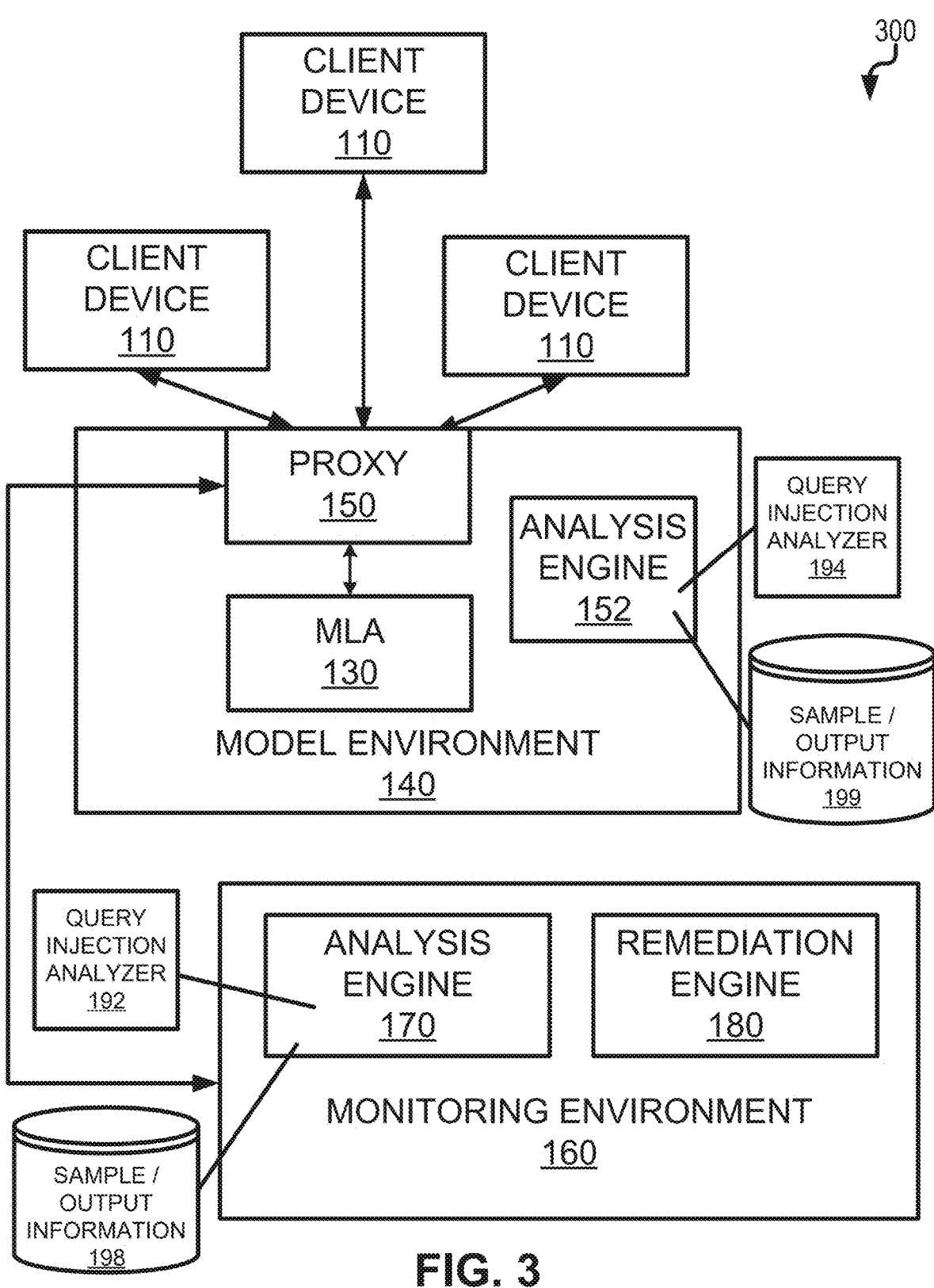
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170. The analysis engine 152 can execute a query injection analyzer 194 which can comprise or otherwise execute algorithms, detection logic, and/or machine learning models which can be used to characterize queries received by the MLA 130. Characterize can include, for example, identifying whether the query seeks to cause the MLA 130 to behave in an undesired manner including, for example, leaking private or otherwise sensitive information. The algorithms, detection logic and/or machine learning models forming part of the query injection analyzer 194 can, in some variations, be the same as those in the query injection analyzer 192. In other variations, the query injection analyzer 194 comprises or executes different algorithms, detection logic, and/or machine learning models than the query injection analyzer 192. The analysis engine 152 and/or the query injection analyzer 194 (either directly or indirectly) can access a data store 199 which, in some variations, sample/output information (e.g., account logs for samples and outputs of the MLA 130 and the like, etc.). The data store 199 can be local to or remote from the model environment 140.

Figure 4:
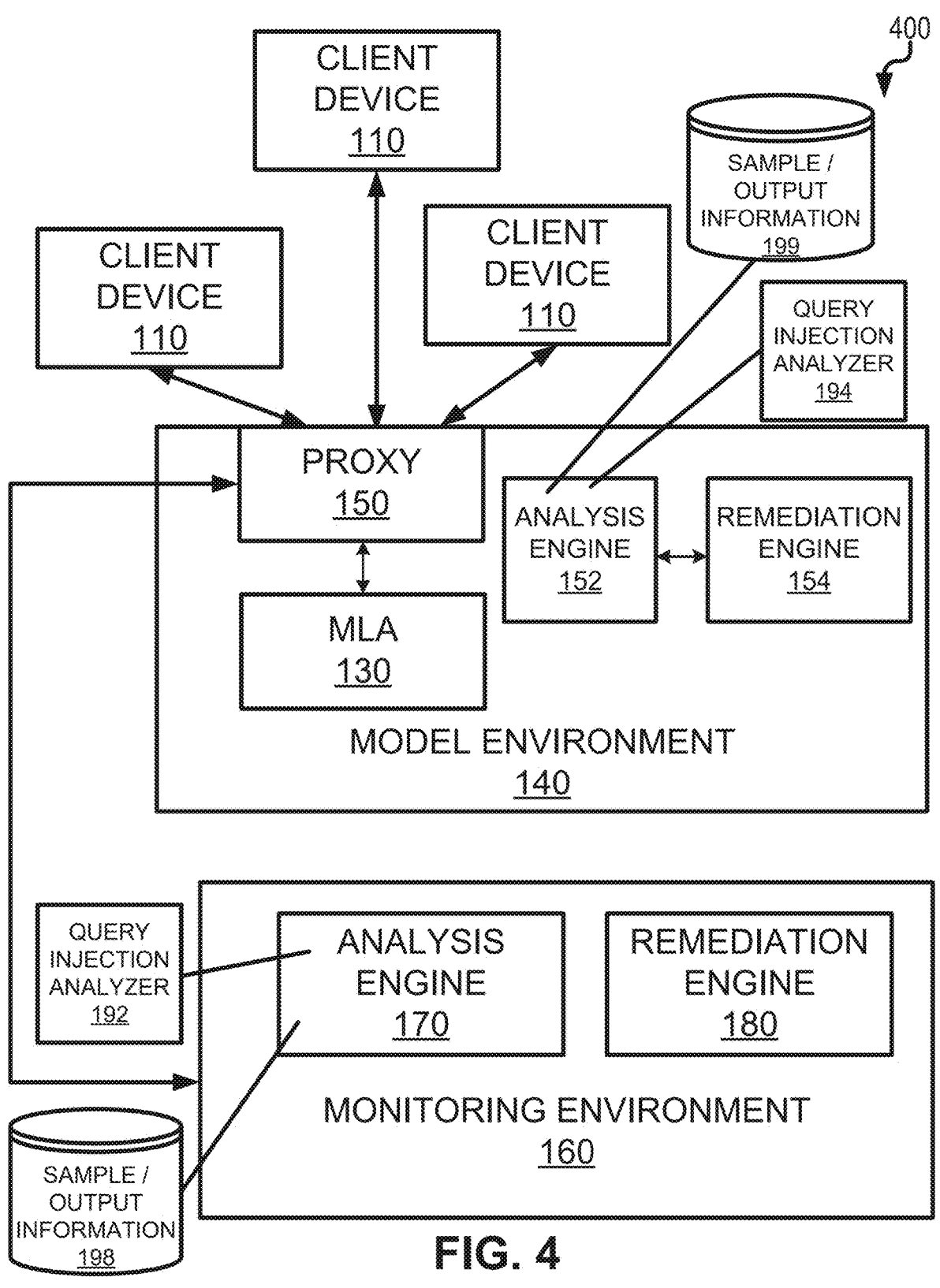
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
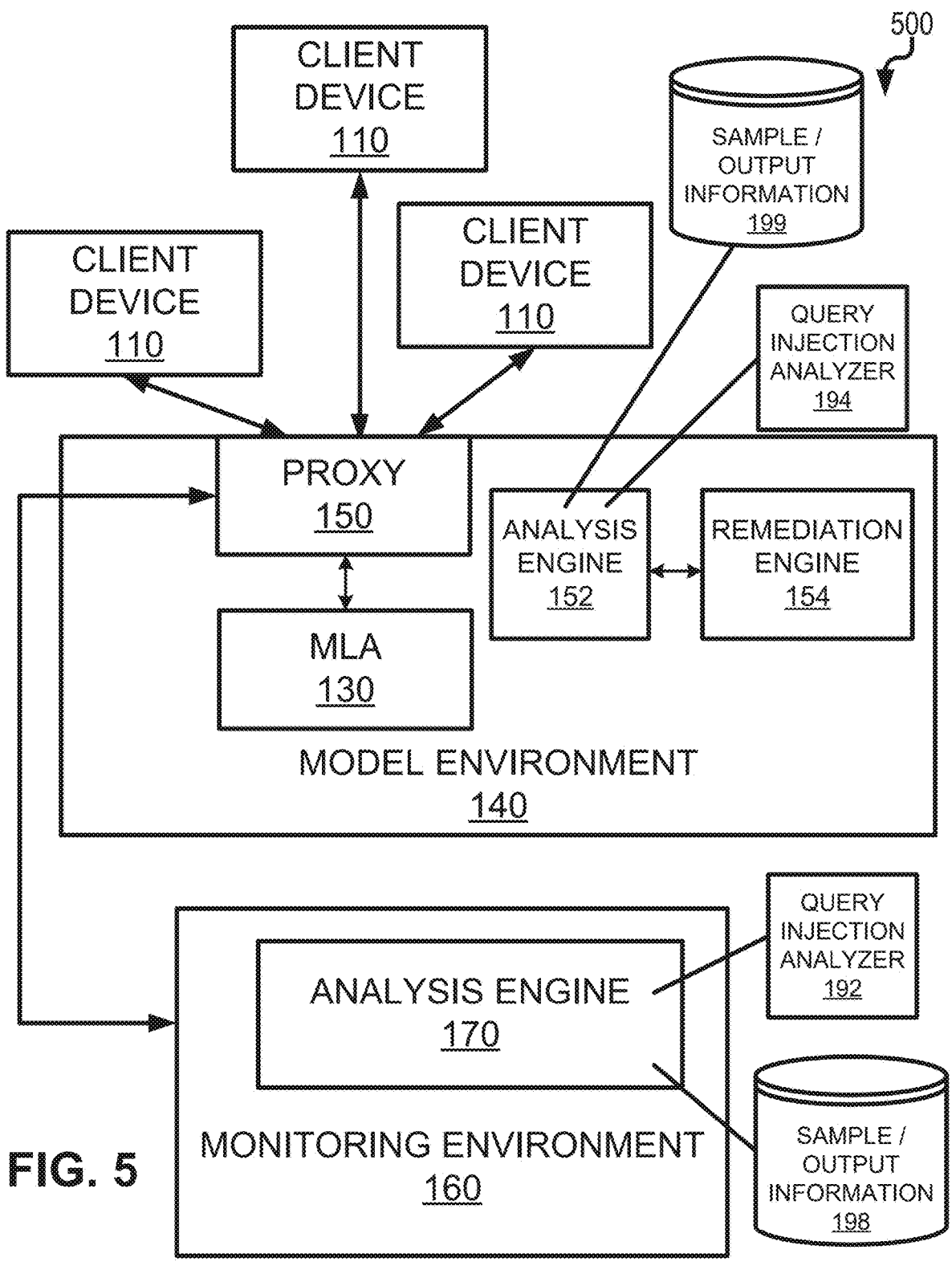
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine

152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
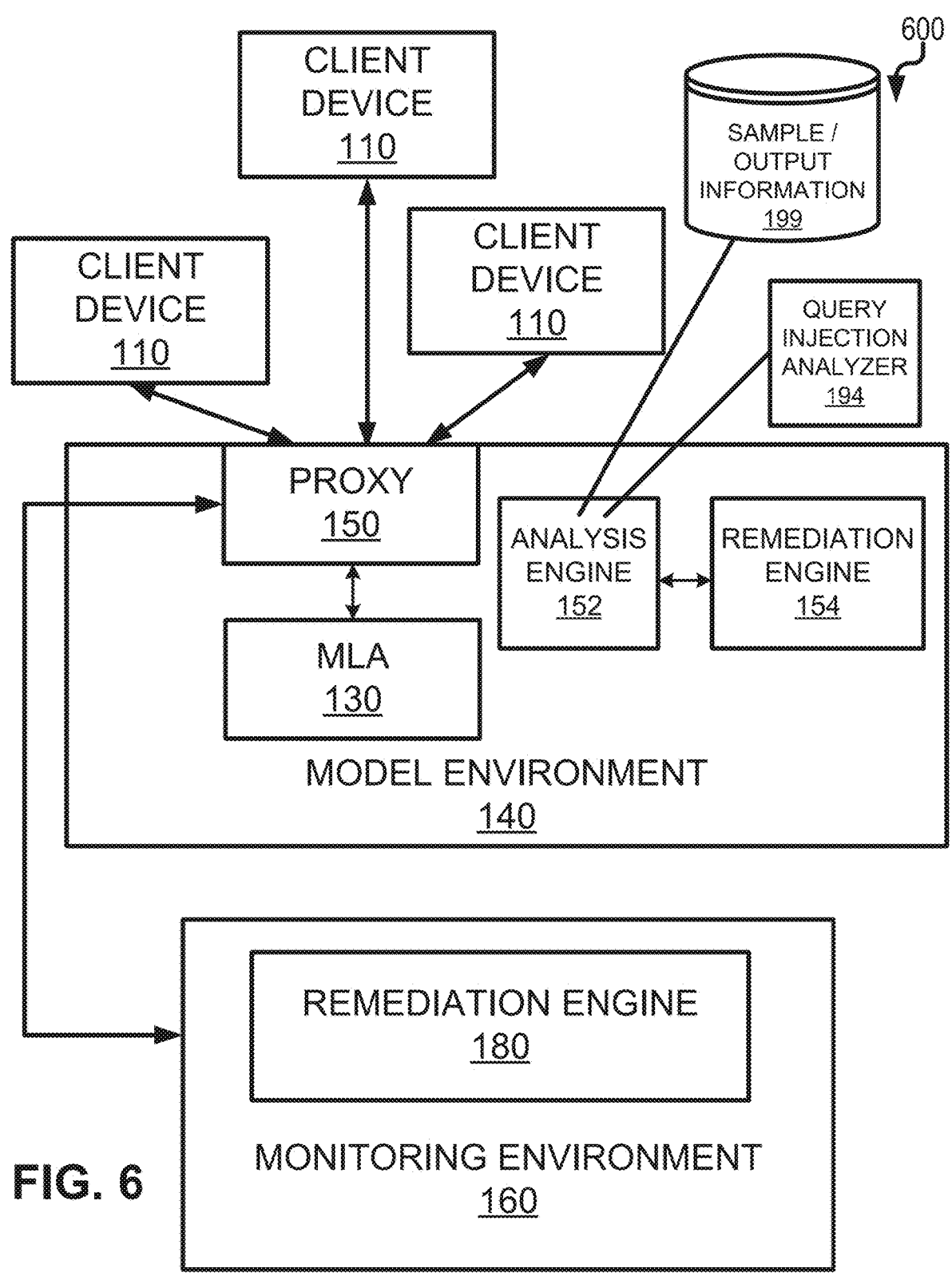
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
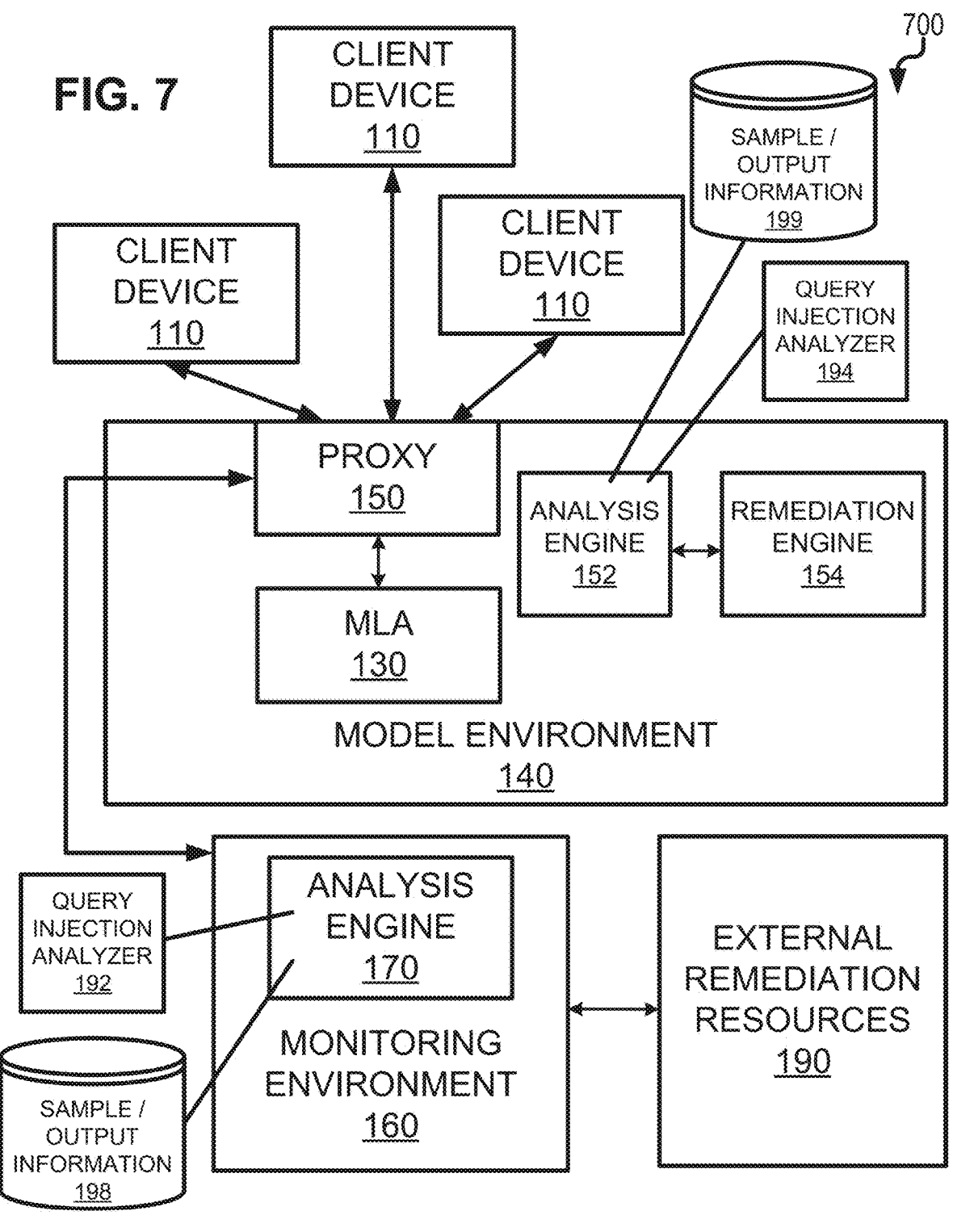
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
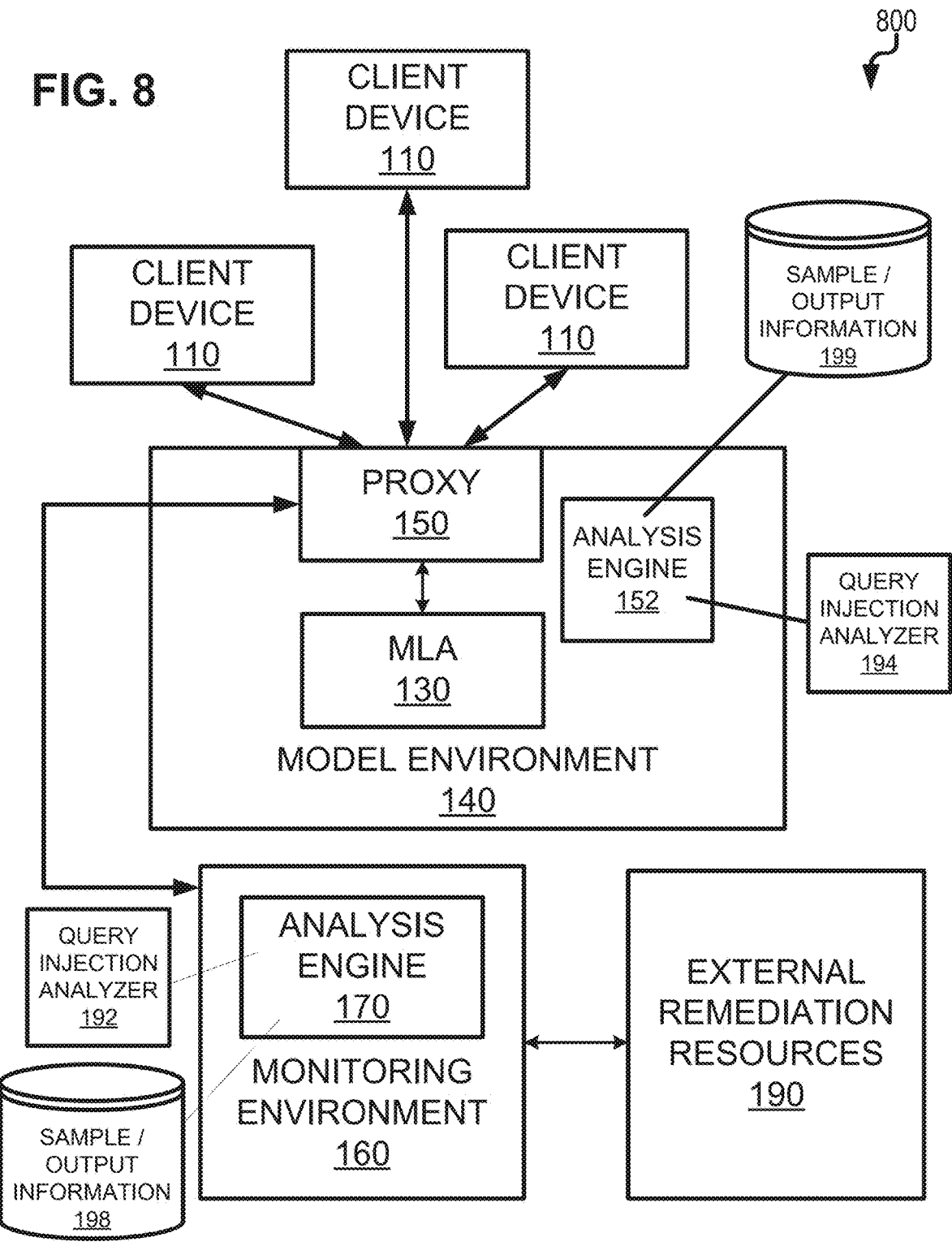
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
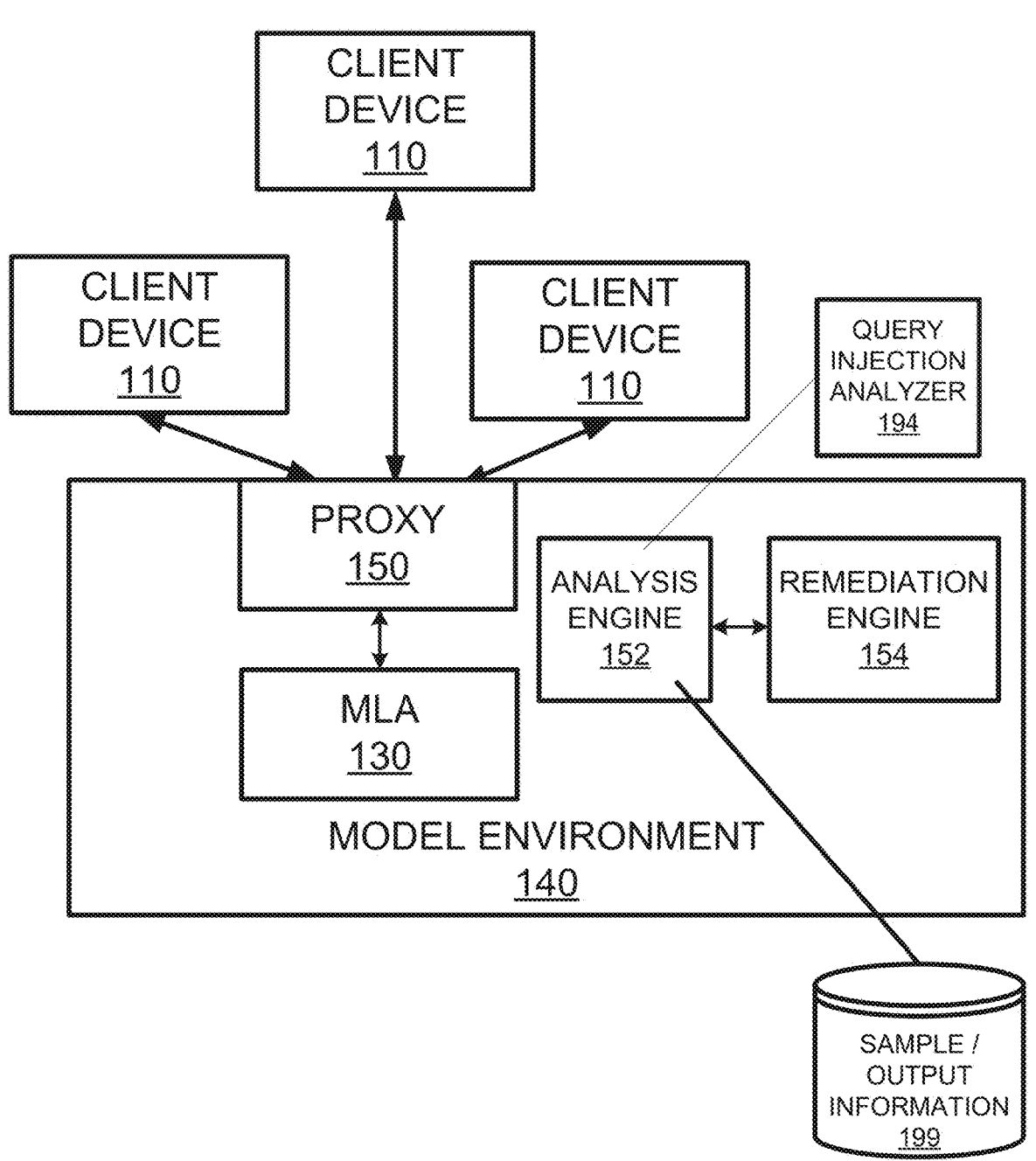
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
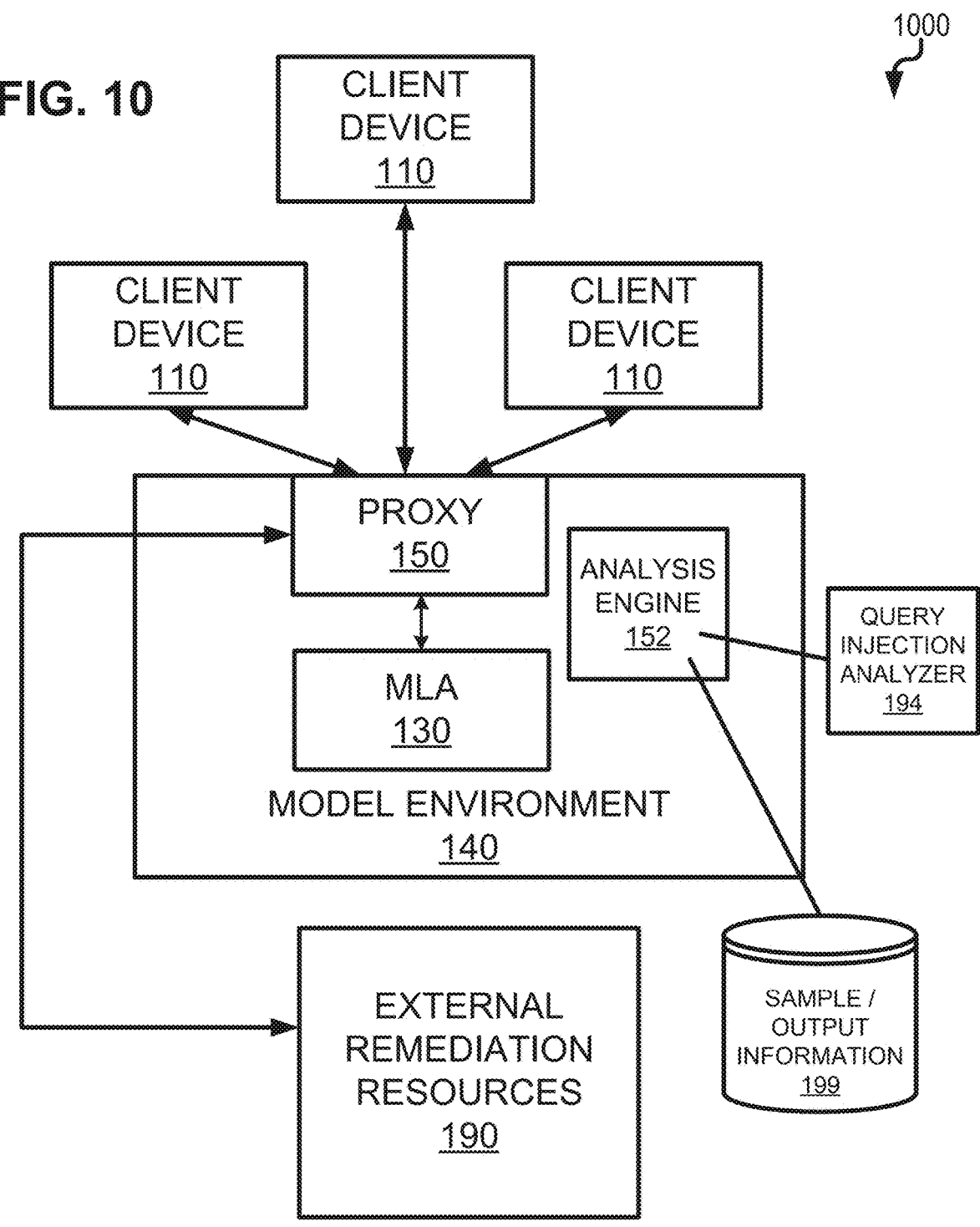
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of queries (e.g., inputs including but not limited to prompts) is conducted local within the model environment 140. Actions requiring remediation are then initiated or otherwise triggered by external remediation resources 190 (which may be outside of the monitoring environment 160) such as those described above.

Figure 11:
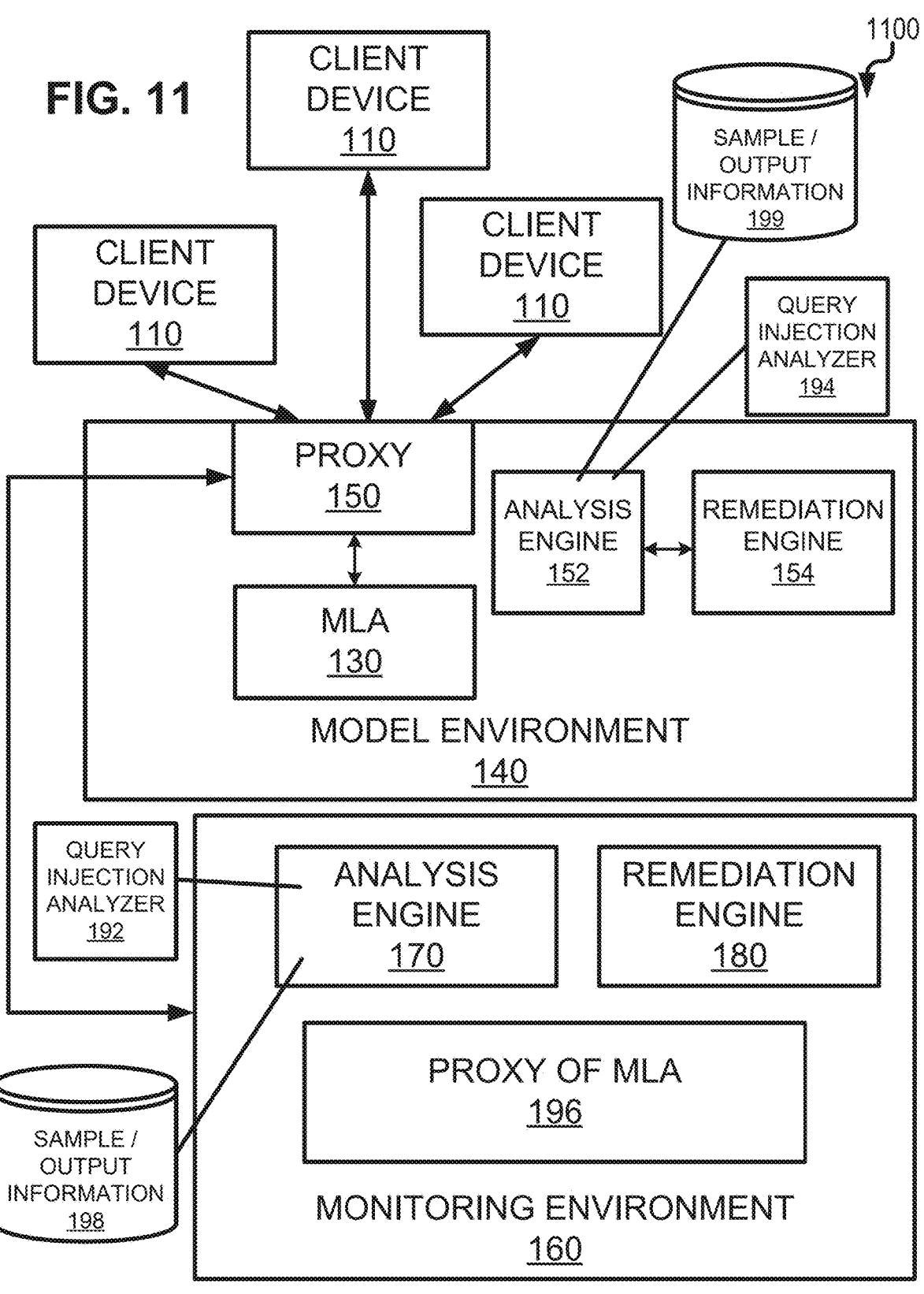
FIG. 11 is a system diagram illustrating a security platform for machine learning model architectures having a model environment which has a proxy of the machine learning architecture.

FIG. 11 is system diagram 11 illustrating a security platform for machine learning model architectures having a configuration in which the model environment includes both a local analysis engine 152 and a local remediation engine 154. The monitoring environment 160, in this variation, can include an analysis engine 170 and a remediation engine 180 as well as a MLA proxy 196 of some or all of the MLA 130. Stated differently, the MLA proxy 196 is a model or series of models that mimic some or all of the behavior of the MLA 130. In this case, the MLA proxy 196 can ingest a query and the output and/or an intermediate result of the MLA proxy 196 can be used by the query injection analyzer 192. Intermediate result can comprise outputs of some or all of layers (prior to the output layer) or other information generated by the MLA 130 before generating a final output. The analysis engine 170 can make a determination of whether to allow the MLA 130 to ingest the query based on an output or intermediate result of the MLA proxy 196.

As indicated above, one or more of the analysis engines 152, 170 can include, execute, or otherwise instantiate a query injection analyzer 192, 194 which, in some variations, comprises a binary classifier which can identify a query as being malicious or benign. In some variations, the query injection analyzer 192, 194 can be a multi-class classifier which can characterize different aspects of a query such as, but not limited to, a level of trustworthiness of the query (e.g. malicious, suspicious, benign, etc.). In some variations, the query injection analyzer 192, 194 can be a multi-class classifier which identifies which of a plurality of different attack types are implicated by an input query. Two or more of these query injection analyzers 192, 194 can form an ensemble of classifiers (i.e., machine learning models). The ensemble of query injection classifiers can be arranged such that two or more of the classifiers are executing in parallel. In other variations, the ensemble of query injection classifiers can be arranged such that two or more classifiers are working in sequence. For example, a binary classifier can first analyze a query to determine whether the query is malicious or benign. If the query is classified as being malicious, a multi-class classifier can analyze the query to determine a particular type of injection attack. This classification by type can be used to take remediation actions which are specifically tailored to the type of attack. Such an arrangement can also be advantageous when the multi-class classifier is more computationally expensive than the binary classifier (which avoids every query being analyzed by the multi-class classifier). Other arrangements can be provided with a lightweight classified being executed by the analysis engine 152 in the model environment 140 and a more computationally expensive model can be executed by the analysis engine 170 in the monitoring environment 160

The query injection analyzer 192, 194 can, in some variations, be a machine learning model such as an XGBoost classification model, a logistic regression model, an XLNet model, an Out of Distribution (OOD) model and the like. In the case of a binary classifier, the query injection analyzer 192, 194 can be trained using a corpus of data which can include a plurality of benign queries that do not contain query injection information and a plurality of malicious queries that contain various character strings (which can include portions of alphanumeric symbols, non-printable characters, symbols, controls, etc.) and the like which encapsulate various sorts of query injection. Malicious queries in this context refer to queries that cause the query injection analyzer 192, 194 to exhibit undesired behavior. Benign queries in this context can refer to queries that do not cause the query injection analyzer 192, 194 to exhibit undesired behavior. In some variations, the queries forming part of the corpus can be labeled with their classification. The model training can be performed by converting the queries into text embeddings which can, amongst other features, be used to train the query injection analyzer 192, 194.

The query injection analyzer 192, 194 can in some variations, use a rules engine or a heuristic-based methods to characterize whether a particular query is malicious (i.e., seeks to cause the MLA 130 to behave in an undesired manner, etc.). The query injection analyzer 192, 194 can include different techniques/algorithms in parallel including machine learning-based techniques as well as non-machine learning-based techniques.

In the case of a multi-class classifier, the training corpus for the query injection analyzer 192, 194 can include different sets of queries for each category (i.e., severity level, type of attack, etc.) which are labeled with their category (e.g., security level, type of attack, etc.). The queries can be transformed into text embeddings which can be used, amongst other features, to train the query injection analyzer 192, 194.

The query injection analyzer 192, 194 can be periodically retrained as new query injection techniques are identified and/or new remediation tools are created. Such an arrangement is advantageous in that the query injection analyzer 192, 194 can evolve to address the continually changing threat landscape.

After the query injection analyzer 192, 194 has been trained, the analysis engine 152, 170 can preprocess incoming queries so that they are suitable for ingestion by the query injection analyzer 192, 194. For example, the raw/original query is transformed into text embeddings and then input into the query injection analyzer 192, 194 which then results in a model prediction. The model prediction for a binary classifier can predict the confidence of the query injection classifier. The output of the model can take varying forms including, for example, a score closer to 1 indicating that the query is malicious and a score closer to 0 is indicating that the query is benign. The model prediction for the multi-class classifiers can identify a category for the query (i.e., a class for which the query injection analyzer 192, 194 has been trained)

The multi-class classifier variation of the query injection analyzer 192, 194 can be used to identify a type of attack and, in some cases, take remedial actions which are specifically tailored to that type of attack (e.g., an attempt to obtain sensitive information or otherwise manipulate an output of the MLA 130). Example attacks include for which the query injection analyzer 192, 194 can be trained include, but are not limited to: a direct task deflection attack, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious queries by injecting special case characters randomly or methodically, to confuse the MLA 130 to output a malicious response. A context continuation attack can include providing the MLA 130 with a single query or multiple queries which follow some permutation of a pattern like: benign query, malicious query, benign query, continuation of malicious query and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the query and tasking the MLA 130 to decrypt the query specifying the encryption method. A text redirection attack can include manipulating or redirecting the flow of text-based communications between users or systems. One or more of the model environment remediation engine 154, the monitoring environment remediation engine 180, or the external remediation resources 190 can take or otherwise initiate remediation activities that are specific to the type of attack and/or based on the severity classification for the query (e.g., malicious, highly suspicious, unknown, unable to classify, etc.). One remediation activity can be to block the IP address of the requester (i.e., the computing device initiating or otherwise relaying the query/input for ingestions by the MLA 130). The IP address can also be used to filter (i.e., modify or otherwise redact) queries before they are input into the MLA 130. The remediation activities can also include generating alerts (e.g., sysadmin alerts) indicating suspicious/malicious queries. Further, the remediation activities can include capturing system/process behavior associated with suspicious/malicious queries for analytics or other tracking purposes.

Turning again to the detection of adversarial attacks by one or more of the analysis engines 152, 170 optionally executing a corresponding query injection analyzer 192, 194. The current subject matter leverages the generalization that similar samples (i.e., prompts, queries, inputs, etc.) should have similar predictions. Based on this assumption, given a new sample x_i, the analysis engines 152, 170 can identify (using the sample/output information 198, 199) samples that are similar to x_i for which predictions y_i (i.e., outputs of the MLA 130, etc.) have been made. The prediction y_i generated from sample x_i can be compared to predictions that were obtained from other samples that are similar to x_i. If those predictions are similar, then the query injection analyzer 192, 194 can predict x_i as being benign (i.e., safe or otherwise not attempting to cause the MLA 130 to behave in an undesired manner). If the predictions are different, then the query injection analyzer 192, 194 can predict x_i as malicious or otherwise likely to cause the MLA 130 to behave in an undesired manner.

If the MLA 130 contains a machine learning model M that to protect and access is only provided to the inputs x_i that are sent to this model M and its corresponding outputs y_i. Assuming there is a large enough number of recorded supposedly clean samples that have already passed through the model M, there will be a dataset of pairs (x_i, y_i). If this dataset is sufficiently representative, then it can be shown or otherwise assumed that similar inputs should map to similar outputs. With this arrangement, the query injection analyzer 192, 194 can detect if a sample is adversarial by taking an input x_i and obtaining its K nearest neighbors (KNN) in the input space s_x this is, [x_1, x_2, . . . , x_k]. Then for x_i and each neighbor, a corresponding output y_i and [y_1, y_2, . . . , y_k] can be obtained. If the sample is benign (i.e., safe, clean, etc.), it is expected that the output y_i will have a distance (or other criteria) within a predefined threshold to the outputs [y_1, y_2, . . . , y_k] in the output space S_y, if not this sample is likely adversarial.

Figure 14:
FIG. 14 is a diagram illustrating a model using an embedded space as input.
Figure 14:
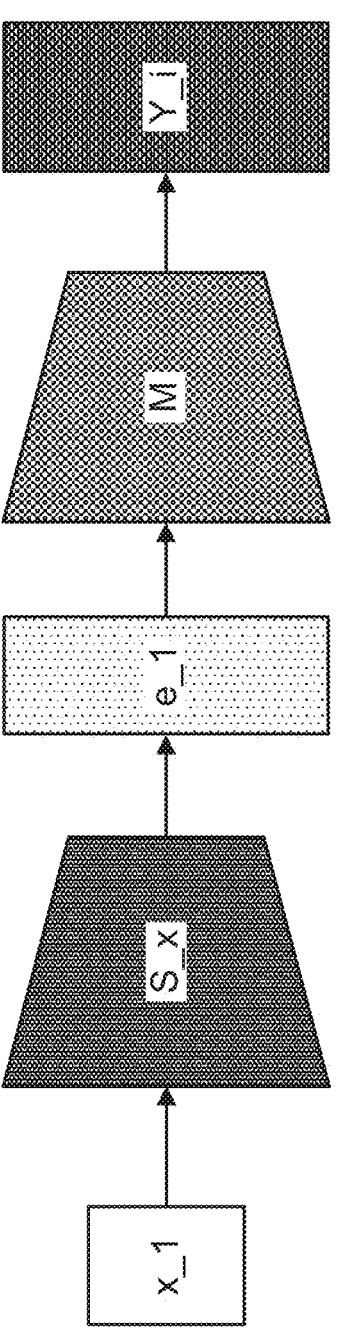
Figure 15:
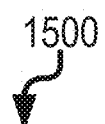
FIG. 15 is a diagram illustrating a model using an original space representation as input.
Figure 15:
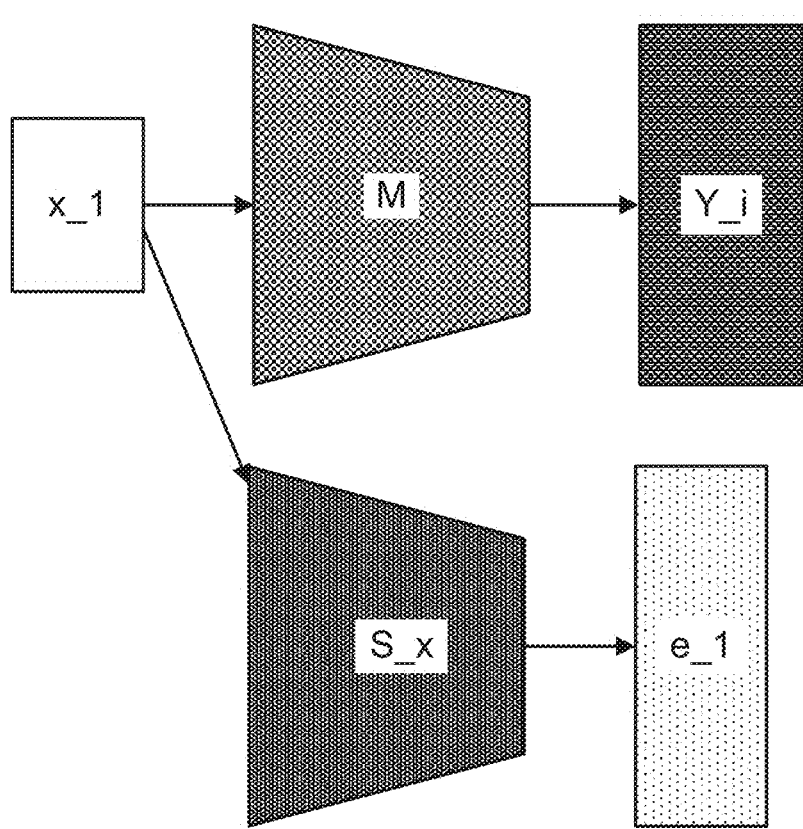
Figure 16:
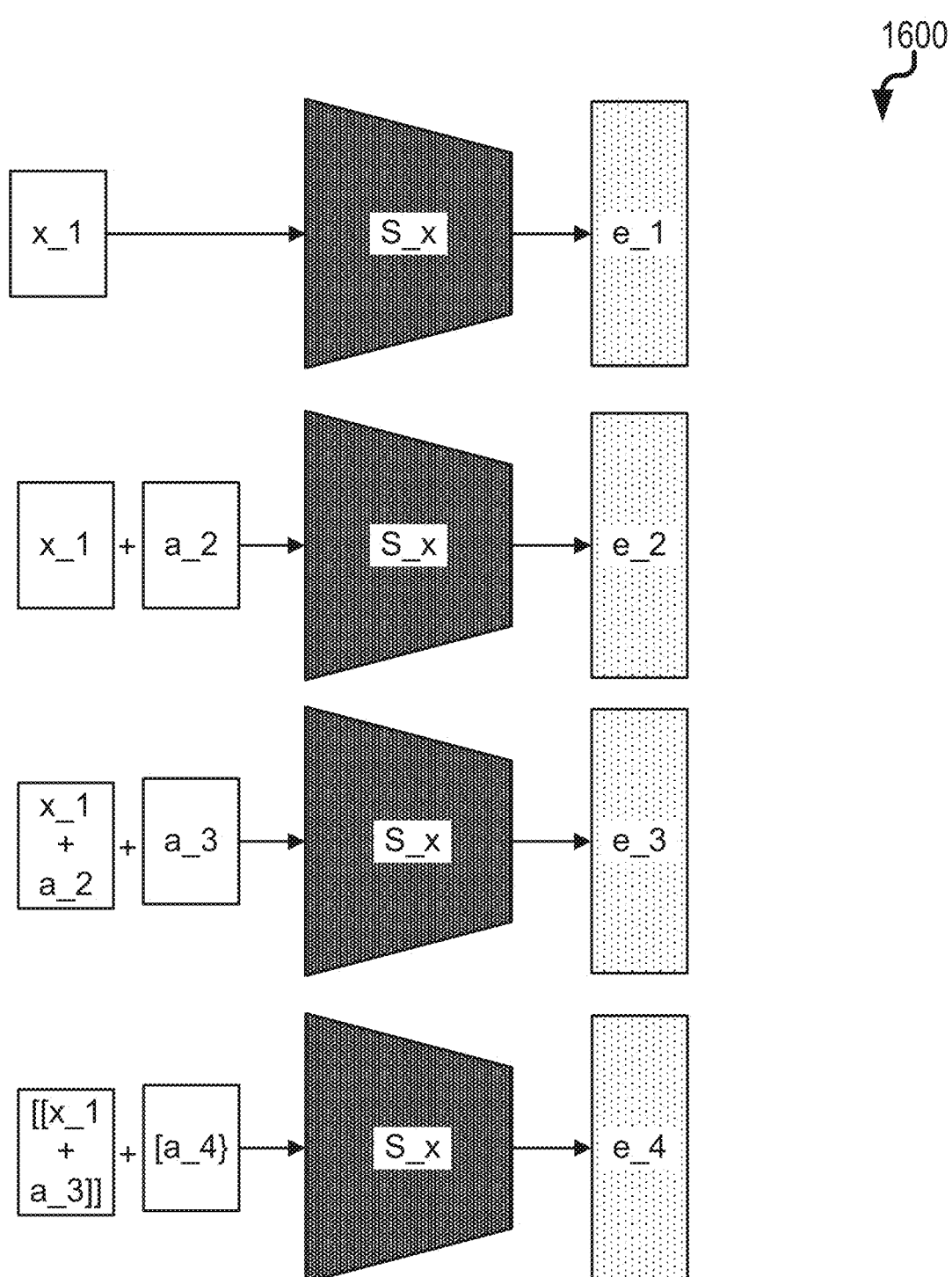
FIG. 16 is a diagram illustrating iterative versions of an attack.

Note that the model M used to make a prediction can use the query embedding as in diagram 1400 of FIG. 14 or the original space as in diagram 1500 of FIG. 15.

With reference to diagram 1500 of FIG. 15, below is an example of an iterative adversarial attack in which a user submits:

sample x, it is embedded as e_1=S_x(x)

sample x+a_2, it is embedded as e_2=S_x(x+a_2)

sample x+a_2+a_3, it is embedded as e_3=S_x(x+a_2+ a_3)

sample x+a_2+a_3+a_4, it is embedded as e_4=S_x(x+ a_2+a_3+a_4)

It is expected that e_1, e_2, e_3 and e_4 will be very close in the embedded space as they only differ based on a very small modification a_i.

Figure 17:
FIG. 17 is a diagram illustrating K nearest neighbors with corresponding distances relative to a single sample.
Figure 17:
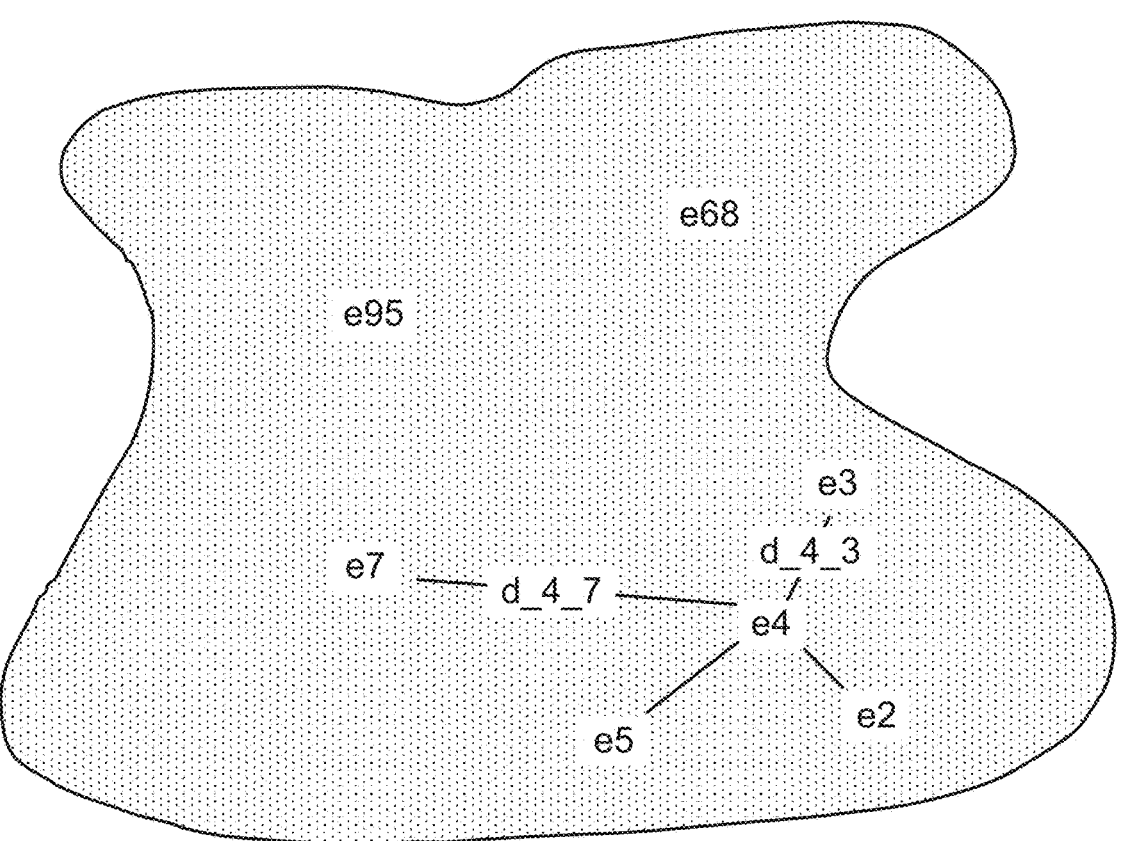
Figure 18:
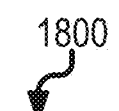
FIG. 18 is a diagram illustrating K nearest neighbors with respective corresponding distances.
Figure 18:
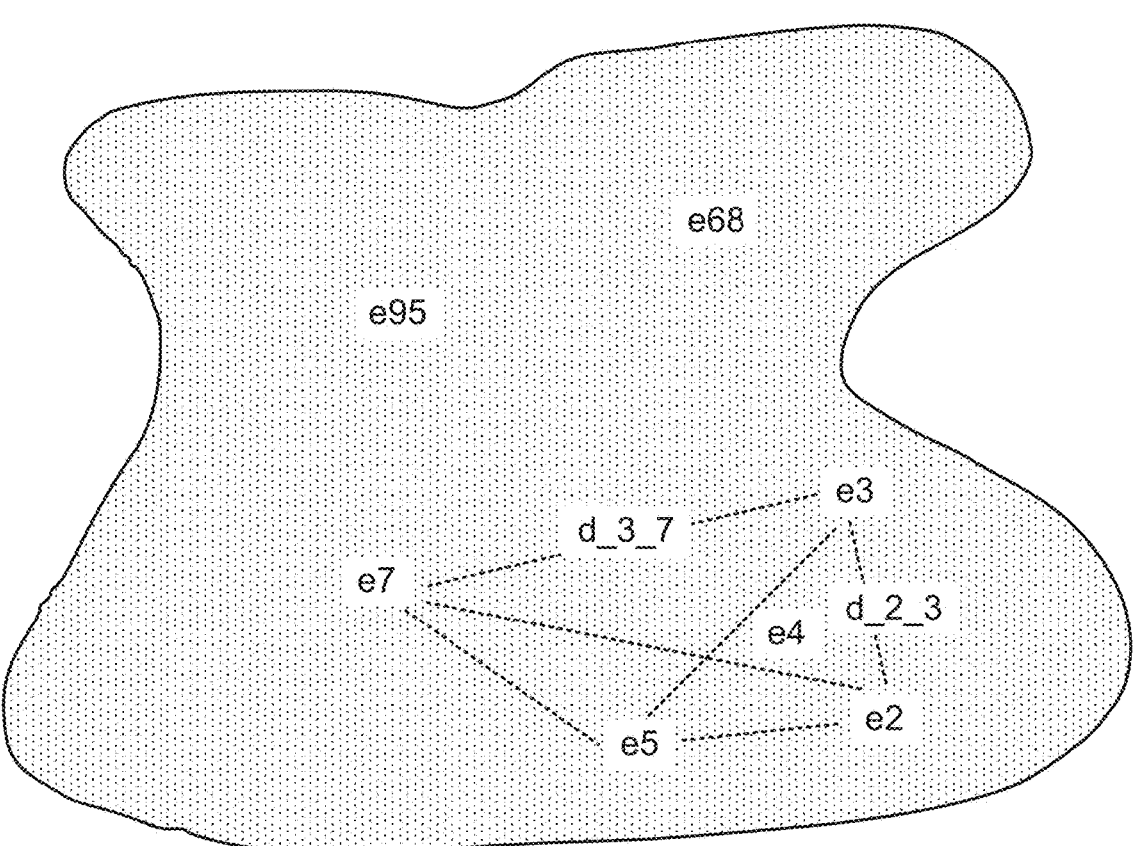
Figure 19:
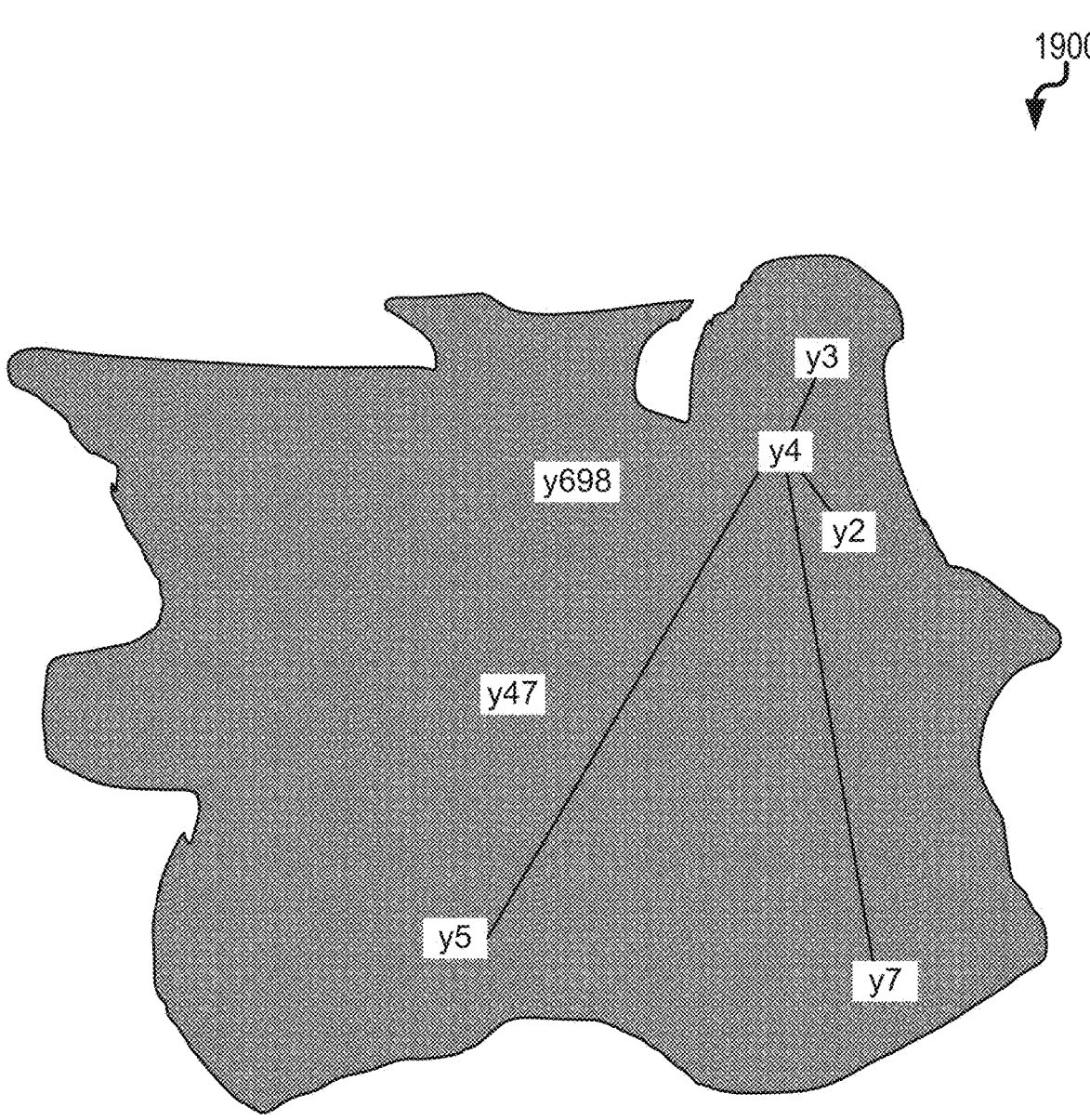
FIG. 19 is a diagram illustrating output space K nearest neighbors.

FIG. 17 is a diagram 1700 which illustrates four nearest neighbors of e4 with corresponding distances. In some variations, such as that illustrated in diagram 1800 of FIG. 18, distances between the nearest neighbors (and not just relative to e4) can be measured or otherwise characterized. FIG. 19 is a diagram illustrating an output space showing KNN of an output y4 which corresponds to the input e4.

The following provides certain operations that can be formed by the query injection analyzer 192, 194 in determining whether a sample (i.e., an input to the MLA 130) is likely to be part of an adversarial attack. Initially, for a first sample x_i, distance-based measurements are conducted to identify neighbors meeting criteria in the input space (based on, for example, data stored or available in the sample/output information 198, 199). For example, the k nearest neighbors are obtained for x_i in the input space. The sample x_i and the nearest neighbors [x_i, x_1, . . . , x_k] can be passed through the model M to obtain corresponding outputs [y_i, y_1, . . . , y_k]. In some cases, the predictions (i.e., the outputs) can be retrieved from the data repositories 198, 199 (or an external). Distances between the various outputs y_1, . . . , y_k are determined relative to the output for the sample y_i. If the mean distances of the outputs (d(y_i, y_1), . . . , d(y_i, y_k)) are greater than or qual to a threshold, the query injection analyzer 192, 194 can characterize the sample as being adversarial. Other aggregation metrics can be used other than mean such as median, average, and the like.

The distance d( ) can be the same function when applied to calculating the neighboring criteria (e.g., KNN, etc.) as when calculating the distance between the predictions d(y_i, y_j) or it can be a different function. The distance function can be for example a Euclidean, Minkowski or cosine distance. If the values are strings, then the distance function can be a Hamming or Levenshtein distance. In the case of classification, the distances might be zero or one depending on if the labels match or not.

Note that when obtaining the KNN, a maximum distance threshold can be utilized to decide if the neighbors are actually near x_i or not. Based on this maximum distance threshold, neighbors that are too far away can be excluded. This maximum distance threshold can also take into account other statistical information like the standard deviation among the distances or any other outlier detection method. In some cases, the maximum distance threshold is variable while in other implementations the maximum distance threshold is static.

In one variation, the distance between x_i and the neighbors can be taken into account as a scaling factor for the relevance of how close should the predictions y_i be, for example, by giving less relevance to samples that are further away, like 1/d(x_i, x_j)*d(y_i, y_j) or similar versions of this.

Note that the input space might be the actual input space or it may be an embedded representation created from the input space.

Figure 12:
FIG. 12 is a diagram illustrating an embedding based on a machine learning model input.
Figure 12:
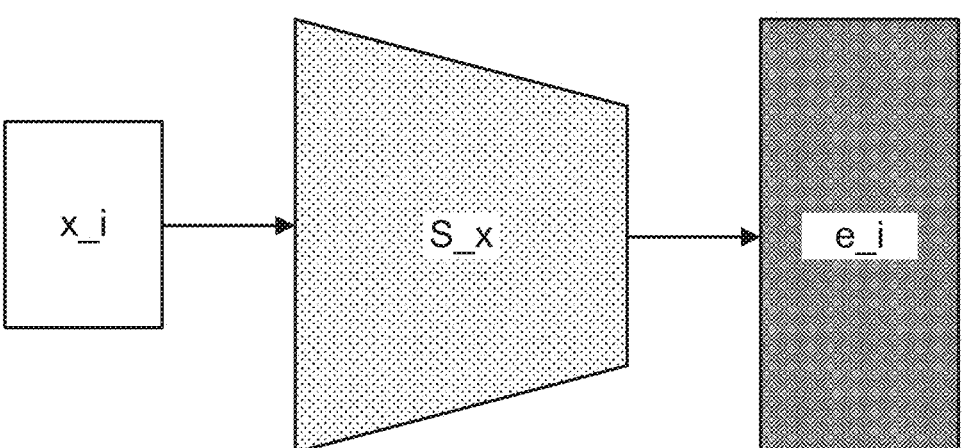

With reference to diagram 1200 of FIG. 12, a vector characterizing information about the input x_i can be input into a machine learning model S_x (e.g., a neural network, etc.) in order to generate an embedding e_i for the query (i.e., a query embedding).

Figure 13:
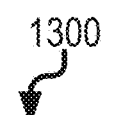
FIG. 13 is a diagram illustrating an embedding based on an output of the machine learning model responsive to the input.
Figure 13:
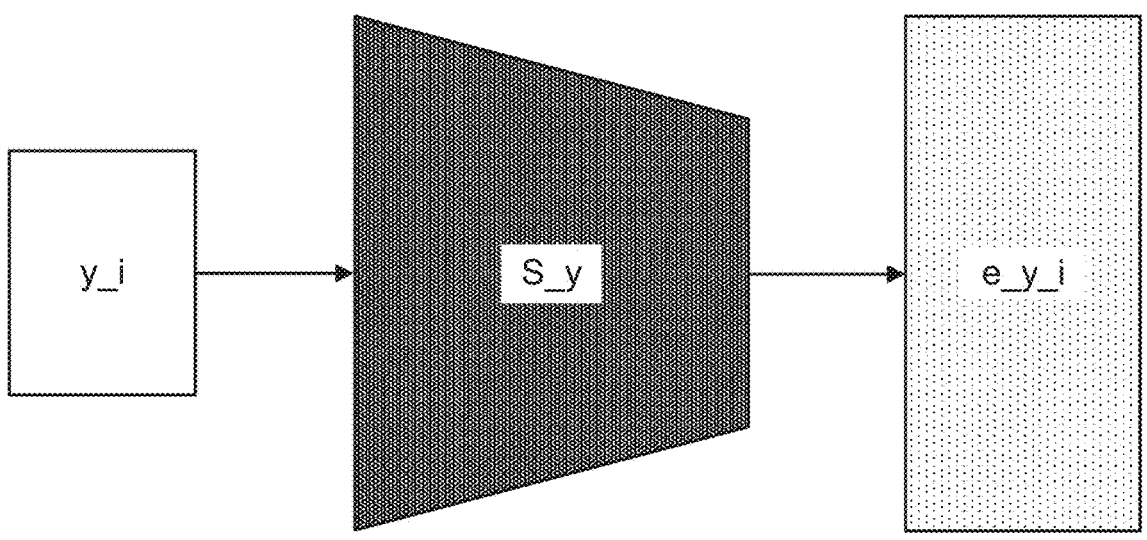

With reference to diagram 1300 of FIG. 13, a vector characterizing information about the output y_i of the MLA 130 responsive to the input x_i can be input into a machine learning model S_y (e.g., a neural network, etc.) in order to generate an embedding e_y_i for the output (i.e., an output embedding).

The embedded representations can be created by training an autoencoder on the previous known data. In other variations, the embedded representation can be generated using a compression method such as hashing. The embedded representation can be generated using a encoder from another application or model, for example an encoder from a large language model like BERT. Similar embedded representation can be applied to the space of the predictions (i.e., the output space, etc.). The query injection analyzer 198, 198 can calculate the distances in the output space or an embedded version of the output space.

In some variations, the distance values can also be a composition of different distances. As an example, the query injection analyzer 192, 194 can calculate d1 as the percentage of features that are different between x_i and x_j and d2 as the cosine distance between x_i and x_j. Then, the query injection analyzer 192, 194 would use the distance=d1*d2 or distance=d2/d1 or distance=(d2)^3*e^d1, etc.

In some variations, the criteria (e.g., KNN analysis, etc.) can t also consider the distances between the identified neighbors (i.e., the KNN, etc.). For example, the query injection analyzer 192, 194 can treat differently a case in which the neighbors are roughly equidistant x_i in perpendicular directions to each other as compared to a scenario in which the samples are all at increasing distances from x_i but following almost a straight line. This information can be used by the query injection analyzer 192, 194 to scale the distance values, discard neighbors, or auto-trigger a final response. In order to detect the geometry of the neighbors, the query injection analyzer 192, 194 can for example calculate the cosine distances in input, output space of both, like cos_distance(x_i, x_j). The query injection analyzer 192, 194 can define group J as the x_j samples that have similar cosine distances with respect to x_i, this is, the ones that are likely in the same direction. Thereafter, the query injection analyzer 192, 194 seeks to differentiate between having a far away cluster made up of samples in group J versus having a line that leads to x_i. So for each sample x_j_1 in group J that is closest to x_i repeat the calculation of the cosine distance, so the query injection analyzer 192, 194 can calculate cos_distance(x_j_1, x_j_k) and check if most of the samples are in the same direction or if they start to disperse. The query injection analyzer 192, 194 can repeat this for the new group J_K. In order to decide if the samples are in a line or a cluster, the query injection analyzer 192, 194 can consider how many groups were created in each iteration and what percentage of the groups was maintained in each iteration. A line will contain many iterations in which most of the group is preserved while a sparse cluster will have few groups and very little group preservation. The query injection analyzer 192, 194 can also use other cluster density estimation methods such as DBSCAN, k-means, level set tree clustering, etc. Based on the number and compactness of clusters, the query injection analyzer 192, 194 can detect if the samples are roughly in a line or not according to each method.

In some variations, if some of the neighbors (e.g., KNN, etc.) are very similar between each other, the query injection analyzer 192, 194 can cluster them and consider them as a single neighbor instead of multiple neighbors.

The query injection analyzer 192, 194 can also utilize a second machine learning model M2 to make decision based on the distances in the space of x or in the space of y or both. For example, the query injection analyzer 192, 194 can instantiate a logistic regression model or neural network that which is trained using, as inputs, the distances d(y_i, y_j) and d(x_i, x_j) in order to make a final decision on whether the sample is adversarial or not. This is F(d(x_i, x_1), . . . , d(x_i, x_N), d(y_i, y_1), . . . , d(y_i, y_N)). The query injection analyzer 192, 194 can also use a model M2 that uses all values, for example F(x_i, x_1, . . . , x_N, y_i, y_1, . . . , y_N).

Figure 20:
FIG. 20 is a diagram illustrating a first detection model architecture for characterizing a likelihood of an adversarial attack.
Figure 20:
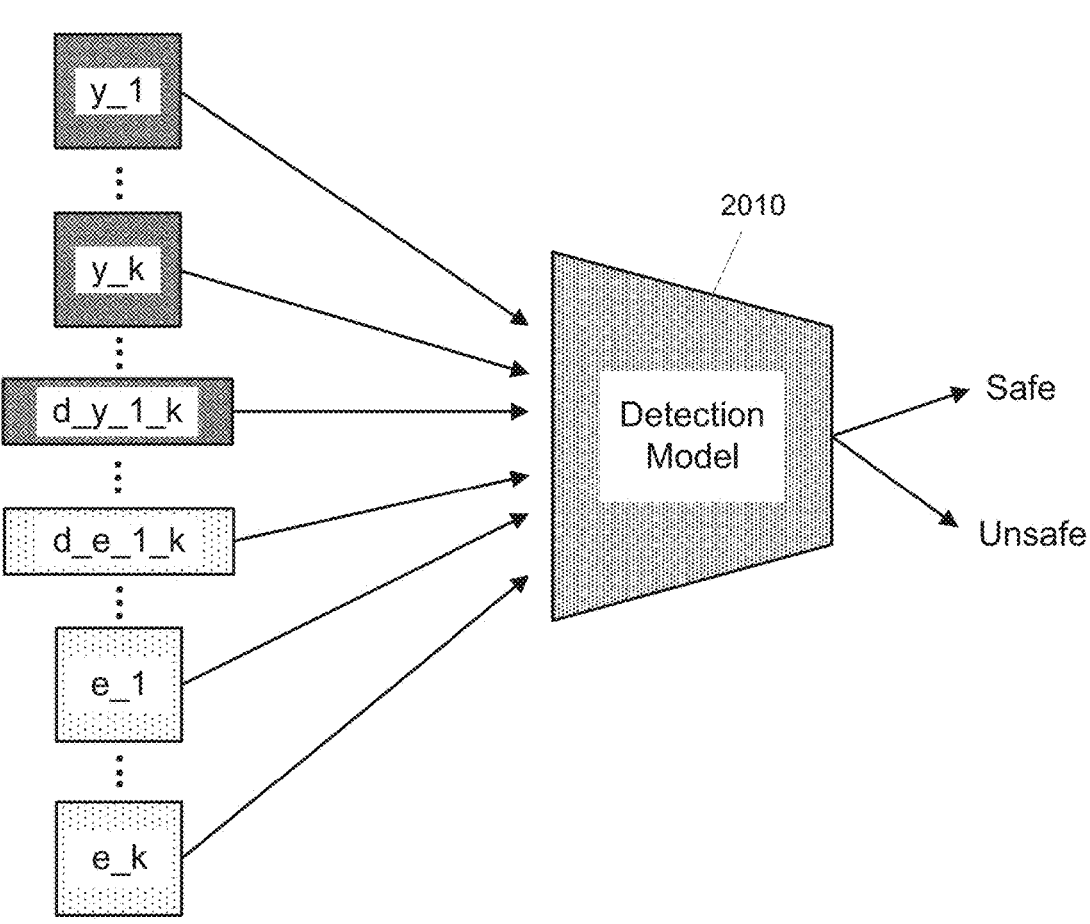

In some cases, and which reference to diagram 2000 of FIG. 20, the analysis engine 152, 170 executes a query injection analyzer 192, 194 which, in turn, executes one or more machine learning-based detection models 2010 (e.g., neural networks, etc.) trained using the distances and other information such as which embedding corresponds to samples and corresponding outputs of the MLA 130. In some variation, information about the K samples along with any other metadata like timestamps or user information available, can be concatenated and then fed into the query injection analyzer 192, 194.

Figure 21:
FIG. 21 is a diagram illustrating a second detection model architecture for characterizing a likelihood of an adversarial attack.
Figure 21:
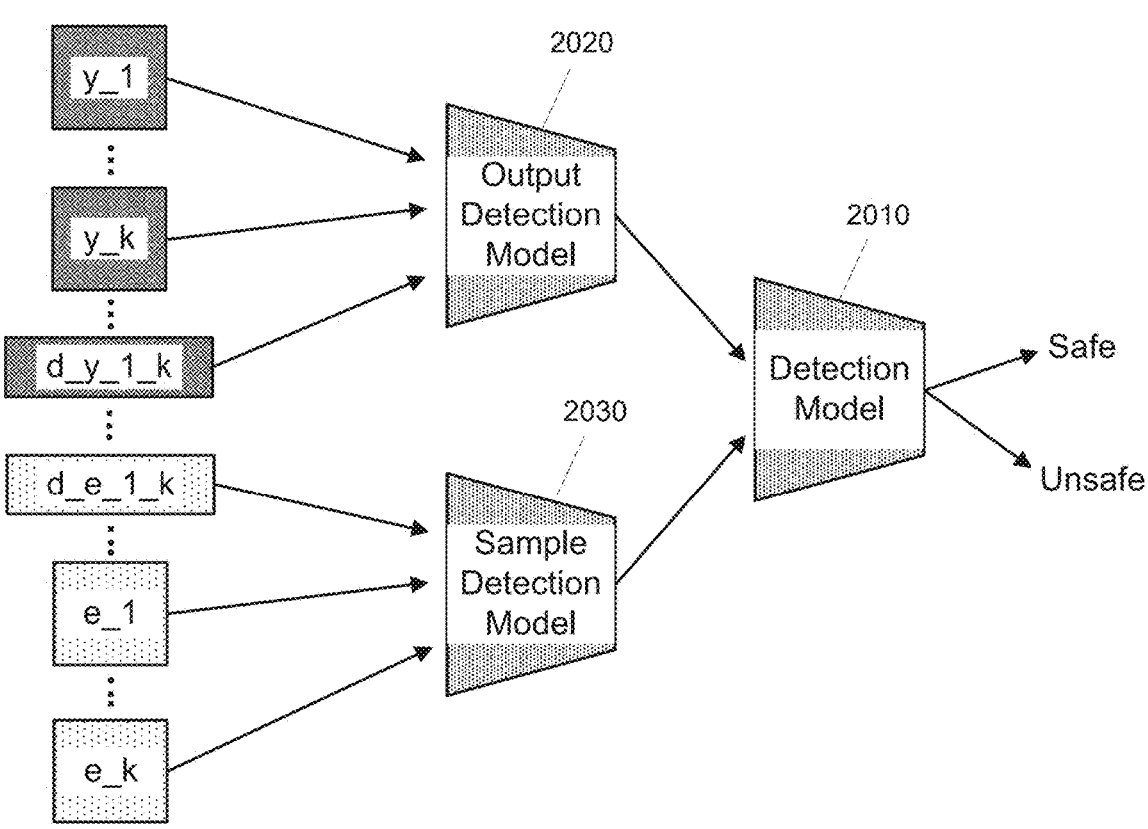

With reference to FIG. 21, another arrangement can be to separate information relating to the samples into a sample detection model 2030 (which can be machine learning-based) and the corresponding outputs into an output detection model 2020 (which can be machine learning-based). The outputs of these models 2020, 2030 can be ingested by the detection model 2010 in order to characterizer or not the sample is likely to cause the MLA 130 to behave in an undesired manner.

With such an arrangement, both of the output detection model 2020 and the sample detection model 2030 indicating an adversarial attack can raise the highest level of alert (which in turn can cause more effective or computationally intensive remediation actions to be initiated). In other variations, if only one of the output detection model 2020 and the sample detection model 2030 generates an output indicative of an adversarial attack, a medium alert or corresponding remediation action can be initiated.

Figure 22:
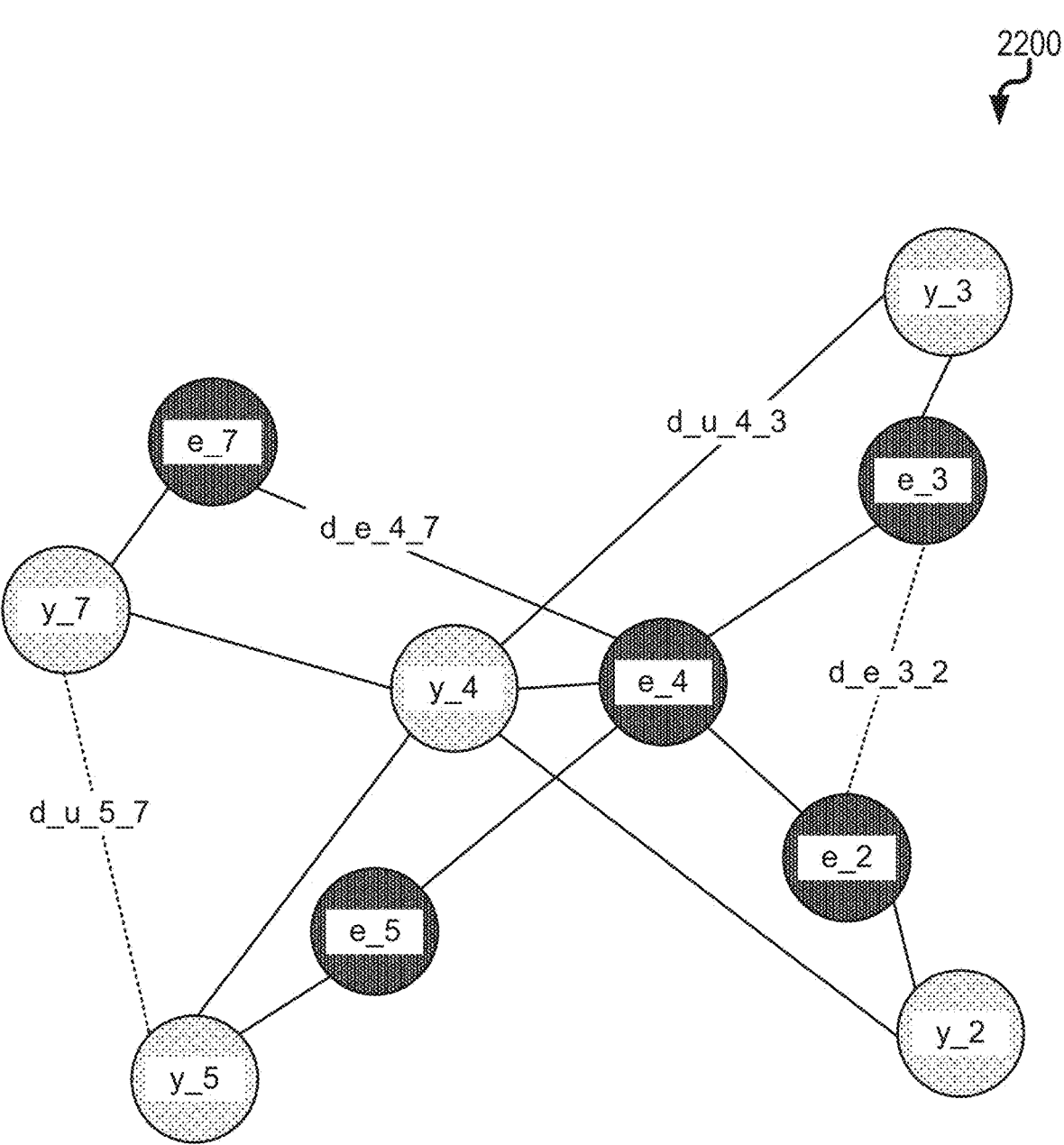
FIG. 22 is a diagram illustrating an example simplified graph representation.

Another way would be to represent this information is as a graph as provided in diagram 2200 of FIG. 22. A graph neural network can be trained to make the prediction by creating an embedded space representation of each sample and the relation with its neighbors and passing these samples to another model to make the final prediction.

In some variations, recency can be used such that the query injection analyzer 199 only consider recent samples or the data store 198, 199 only includes 'recent' samples. Recency can be based, for example, on a time window or the more recent N samples in a history of submitted samples. This arrangement can be beneficial for addressing computational constraints and/or in order to better capture data drift.

In some variations, only samples submitted by the same user are considered. In other variations, the sample in question might be compared to samples submitted from all users or from public or private datasets or a mix of all the previously mentioned sources.

The query injection analyzer 192, 194 can assign a special scaling weight or interactions to samples that have been submitted by this user. For example, the query injection analyzer 192, 194 can assign a weight of zero to exclude samples submitted by the user in the analysis and to extend the number of neighbors in order to have N neighbors. This arrangement can, for example, be beneficial for the scenario in which the user is slowly crafting adversarial samples in order to bypass the detection mechanism. The query injection analyzer 192, 194 can also include an extra term in the decision function that considers what percentage of the neighbors (e.g., KNN) are submitted by the user and if they follow a pattern (e.g., a line, etc.(. This extra term in the decision function can be added as an extra variable in the case of M2 for example $F(x\_i, x\_1, \ldots, x\_N, y\_i, y\_1, \ldots, y\_N, percentage\_of\_knn\_from\_user)$ or in step 3, it could be an extra condition like "mean$(d(y\_i, y\_1), \ldots, d(y\_i, y\_k))$>threshold {or, and} percentage\_of\_knn\_from\_user>threshold\_2". In another instance, the query injection analyzer 192, 194 can increase the relevance of samples submitted by this user by adding or otherwise using a scaling weight.

Still further, in some variations, the query injection analyzer 192, 194 can scan for watermarks introduced by generative models and this information can be extracted as or otherwise used to derive a feature for the model.

FIG. 23 is a diagram 2300 in which, at 2310, a query to be input into a machine learning model (or other artificial intelligence model) is received. Thereafter, at 2320, a plurality of historical queries of the machine learning model meeting first criteria (e.g., distance, within n nearest neighbors, within a centroid, etc.) relative to the query is determined using a first distance-based similarity analysis technique. Each of the historical queries have a known output by the machine learning model. In addition, at 2330, An output of the machine learning model responsive to query is received. Next, at 2340, it is determined, using a second distance-based similarity analysis technique, whether the output meets second criteria (e.g., distance, within k nearest neighbors, within a centroid, etc.) relative to each of the known outputs corresponding to the historical queries. This determination characterizes whether the query is likely to cause the machine learning model to behave in an undesired manner and can be provided, at 2350, to a consuming application or process. In some cases, a remediation action can be initiated by the consuming application or process (or downstream thereof) to prevent the machine learning model from behaving in an undesired manner.

FIG. 24 is a diagram 2400 in which, at 2410, a query is received which is to be input into a first machine learning model. A plurality of historical queries of the first machine learning model meeting first criteria (e.g., distance, within n nearest neighbors, within a centroid, etc.) relative to the query are determined, at 2420, using a first distance-based similarity analysis technique. Each of the historical queries has a known output by the first machine learning model. In addition, at 2430, an output of the machine learning model responsive to the output is received. It is then determined, at 2440 and using a second distance-based similarity analysis technique, whether the output meets second criteria (e.g., distance, within k nearest neighbors, within a centroid, etc.) relative to each of the known outputs corresponding to the historical queries. Data characterizing the determinations respectively made using the first distance-based similarity analysis technique and the second distance-based similarity analysis techniques (e.g., extracted features and/or derived features, etc.) are input, at 2450, into a second machine learning model to generate an attack score. The attack score indicates a likelihood of the query causing the first machine learning model to behave in an undesired manner. The attack score can be provided, at 2460, to a consuming application or process. In some cases, a remediation action can be initiated by the consuming application or process (or downstream thereof) based on the attack score meeting or exceeding a threshold to prevent the first machine learning model from behaving in an undesired manner.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving a query to be input into a machine learning model;
first determining, using a first distance-based similarity analysis technique, a plurality of historical queries of the machine learning model meeting first criteria relative to the query, each of the historical queries having a known output by the machine learning model;
receiving an output of the machine learning model responsive to ingesting the query;
second determining, using a second distance-based similarity analysis technique, whether the output meets second criteria relative to each of the known outputs corresponding to the historical queries, the second determination characterizing whether the query is likely to cause the machine learning model to behave in an undesired manner, the second determining including comparing the output to outputs of the historical queries identified by the first determining, and identifying a case where the output is not similar to outputs of the historical queries that, are similar to the query the undesired manner including misclassifying, providing wrong values as outputs, leaking private or sensitive information, or enabling replication of the machine learning model; and providing the second determination to a consuming application or process to initiate a remediation action or provide data characterizing a potential attack on the first machine learning model.

2. The method of claim 1, wherein the first distance-based similarity analysis technique is same as the second distance-based similarity analysis technique.

3. The method of claim 1, wherein the first distance-based similarity analysis technique is different from second distance-based similarity analysis technique.

4. The method of claim 1, wherein the first criteria is a first distance threshold and the second criteria is a second, different distance threshold.

5. The method of claim 1, wherein the first criteria is a distance threshold and the second criteria is a same distance threshold.

6. The method of claim 1, wherein at least a portion of the historical queries originated from a requestor of the query.

7. The method of claim 1, wherein at least a portion of the historical queries originated from users different from a requestor of the query.

8. The method of claim 1, wherein a first portion of the historical queries originated from a requestor of the query and a second portion of the historical queries originated from users different from the requestor.

9. The method of claim 8, wherein the first portion of the historical queries are weighted differently than the second portion of the historical queries.

10. The method of claim 1, wherein at least one of the first distance-based similarity analysis and the second distance-based similarity analysis comprises a k-nearest neighbor analysis.

11. The method of claim 1, wherein at least one of the first distance-based similarity analysis and the second distance-based similarity analysis calculates a Euclidean distance.

12. The method of claim 1, wherein at least one of the first distance-based similarity analysis and the second distance-based similarity analysis calculates a Minkowski distance.

13. The method of claim 1, wherein at least one of the first distance-based similarity analysis and the second distance-based similarity analysis calculates a cosine distance.

14. The method of claim 1, wherein at least one of the first distance-based similarity analysis and the second distance-based similarity analysis calculates a Hamming distance.

15. The method of claim 1, wherein at least one of the first distance-based similarity analysis and the second distance-based similarity analysis calculates a Levenshtein distance.

16. The method of claim 1, wherein at least one of the first distance-based similarity analysis and the second distance-based similarity analysis calculates two or more of: k-nearest neighbors, a Euclidian distance, a Minkowski distance, a cosine distance, a Hamming Distance and/or a Levenshtein distance.

17. The method of claim 4, wherein the second determining further comprises:
calculating a mean distance of the output to the known outputs corresponding to the historical queries; and
comparing the mean distance to a distance threshold to determine whether the second criteria was met.

18. The method of claim 4, wherein at least one of the first distance threshold or the second distance threshold is fixed at a pre-defined value.

19. The method of claim 4, wherein at least one of the first distance threshold or the second distance threshold is variable.

20. The method of claim 1, wherein at least some of the historical queries are derived from a cluster of neighboring historical queries.

21. The method of claim 1, wherein at least one of the first distance-based similarity analysis and the second distance-based similarity analysis considers distances between neighbors within the plurality of historical queries.

22. A computer-implemented method comprising:

receiving a query to be input into an artificial intelligence (AI) model;

generating an embedding based on the query;

first determining, using a first distance-based similarity analysis technique, a plurality of historical queries of the AI model having a corresponding embedding meeting first criteria relative to the generated embedding, each of the historical queries having a known output by the AI model;

receiving an output of the AI model responsive to ingesting the query;

second determining, using a second distance-based similarity analysis technique, whether the output meets second criteria relative to each of the known outputs of the historical queries, the second determination characterizing whether the query is likely to cause the AI model to behave in an undesired manner, the second determining including comparing the output to outputs of the historical queries identified by the first determining, and identifying a case where the output is not similar to outputs of the historical queries that are similar to the query, the undesired manner including misclassifying, providing wrong values as outputs, leaking private or sensitive information, or enabling replication of the AI model; and providing the second determination to a consuming application or process.

23. The method of claim 22 further comprising:

generating an embedding based on the output;

wherein the second determining is based on whether the embedding generated based on the output meets the second criteria relative to embeddings corresponding to each of the known outputs of the historical queries.

24. A computer-implemented method comprising:

receiving a query to be input into a machine learning model;

first determining, using a first distance-based similarity analysis technique, a plurality of historical queries of the machine learning model meeting first criteria relative to the query, each of the historical queries having a known output by the machine learning model;

receiving an output of the machine learning model responsive to ingesting the query;

generating an embedding based on the output;

second determining, using a second distance-based similarity analysis technique, whether the generated output meets second criteria relative to embeddings corresponding to each of the known outputs of the historical queries, the second determination characterizing whether the query is likely to cause the machine learning model to behave in an undesired manner, the second determining including comparing the embedding of the output to embeddings of outputs of the historical queries identified by the first determining, and identifying a case where the embedding of the output is not similar to embeddings of outputs of the historical queries that are similar to the query, the undesired manner including misclassifying, providing wrong values as outputs, leaking private or sensitive information, or enabling replication of the machine learning model; and providing the second determination to a consuming application or process to initiate a remediation action or provide data characterizing a potential attack on the machine learning model.

25. The method of claim 24 further comprising:

generating an embedding based on the query;

wherein the first determining is based on whether the embedding generated based on the query meets the first criteria relative to embeddings corresponding to inputs for each of the known of the historical queries.

26. A computer-implemented method comprising:

receiving a query to be input into a first machine learning model;

first determining, using a first distance-based similarity analysis technique, a plurality of historical queries of the first machine learning model meeting first criteria relative to the query, each of the historical queries having a known output by the first machine learning model;

receiving an output of the first machine learning model responsive to ingesting the query;

second determining, using a second distance-based similarity analysis technique, whether the output meets second criteria relative to each of the known outputs corresponding to the historical queries, the second determining including comparing the output to outputs of the historical queries identified by the first determining, and identifying a case where the output is not similar to outputs of the historical queries that are similar to the query;

inputting data characterizing the first determination and the second determination into a second machine learning model to generate an attack score, the attack score indicating a likelihood of the query causing the first machine learning model to behave in an undesired manner, the undesired manner including misclassifying, providing wrong values as outputs, leaking private or sensitive information, or enabling replication of the first machine learning model; and providing the attack score to a consuming application or process to initiate one or more remediation actions or provide data characterizing a potential attack on the first machine learning model.

27. The method of claim 26, wherein a second consuming application or second process downstream from the consuming application or process to which the attack score is provided initiates the one or more remediation actions.

28. The method of claim 1, wherein the first determining comprises obtaining K nearest neighbors of the query in an embedded representation of the input space subject to a maximum distance threshold, and wherein the second determining comprises calculating, in an embedded representation of the output space, a mean of distances between the output and outputs corresponding to the K nearest neighbors computed as Hamming distances and comparing the mean to a distance threshold, and wherein at least one of the first distance-based similarity analysis and the second distance-based similarity analysis considers distances between the K nearest neighbors.

29. The method of claim 1, wherein the plurality of historical queries is limited to recent samples based on a time window and to samples submitted by the same user, and wherein samples submitted by the user are assigned a weight of zero and a number of neighbors is extended to obtain N neighbors excluding the user's samples, and wherein providing the second determination comprises transmitting data to a proxy that causes the query to be blocked before ingestion by the machine learning model.

30. The method of claim 1, wherein:

the first determining uses an input embedding spaced generated by an autoencoder trained on clean historical inputs to the machine learning model; and the second determining uses an output embedding space generated by an autoencoder trained on outputs of the machine learning model.

\* \* \* \* \*